(12) United States Patent
Danyi et al.

(10) Patent No.: US 12,141,047 B1
(45) Date of Patent: Nov. 12, 2024

(54) CONFIGURING AUTOMATED WORKFLOWS FOR APPLICATION PERFORMANCE MONITORING

(71) Applicant: Splunk Inc., San Francisco, CA (US)

(72) Inventors: Gergely Danyi, Cupertino, CA (US); Sakshi Garg, San Francisco, CA (US); Maxime Petazzoni, San Mateo, CA (US); Sahinaz Safari Sanjani, San Mateo, CA (US); Timothy Matthew Robin Williamson, Santa Barbara, CA (US); Eric Wohlstadter, Atherton, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/589,637

(22) Filed: Jan. 31, 2022

Related U.S. Application Data

(60) Provisional application No. 63/257,056, filed on Oct. 18, 2021.

(51) Int. Cl.
  *G06F 9/44* (2018.01)
  *G06F 11/36* (2006.01)

(52) U.S. Cl.
  CPC ...... *G06F 11/3612* (2013.01); *G06F 11/3636* (2013.01); *G06F 11/3664* (2013.01)

(58) Field of Classification Search
  CPC ............. G06F 11/3612; G06F 11/3636; G06F 11/3664
  See application file for complete search history.

(56) References Cited

U.S. PATENT DOCUMENTS

| | | | |
|---|---|---|---|
| 7,882,193 B1* | 2/2011 | Aronson | H04L 51/212 709/202 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,747,191 B1 | 8/2017 | Marolia et al. | |
| 10,127,258 B2 | 11/2018 | Lamas et al. | |
| 10,708,344 B1* | 7/2020 | Zhao | H04L 41/40 |
| 11,645,141 B2 | 5/2023 | Wieder et al. | |

(Continued)

OTHER PUBLICATIONS

Splunk Enterprise 8.0.0 Overview, available online, retrieved May 20, 2020 from docs.splunk.com.
(Continued)

*Primary Examiner* — Hang Pan
(74) *Attorney, Agent, or Firm* — Kilpatrick Townsend & Stockton LLP

(57) ABSTRACT

A method of computing real-time metrics for automated workflows includes aggregating a set of ingested spans into a set of traces. The method further includes executing a set of rules to determine a set of workflows associated with the set of traces, wherein each workflow of the set of workflows is associated with a respective trace of the set of traces, and wherein each workflow is operable to group together activity associated with a client process within a respective trace. The method also includes assigning a name to each workflow based on the rules and computing real-time metrics for each of the workflows.

20 Claims, 31 Drawing Sheets

(56) References Cited

U.S. PATENT DOCUMENTS

| | | |
|---|---|---|
| 2004/0078683 A1 | 4/2004 | Buia et al. |
| 2004/0078691 A1* | 4/2004 | Cirne ................. G06F 11/3636 714/E11.207 |
| 2005/0278431 A1* | 12/2005 | Goldschmidt ...... H04L 41/0869 709/207 |
| 2007/0074080 A1 | 3/2007 | Fitzgerald |
| 2010/0058112 A1 | 3/2010 | Kim et al. |
| 2010/0153316 A1* | 6/2010 | Duffield ................. H04L 41/00 706/47 |
| 2015/0149835 A1 | 5/2015 | Jayaraman |
| 2019/0098106 A1 | 3/2019 | Mungel et al. |
| 2019/0188068 A1 | 6/2019 | Mane et al. |
| 2019/0303266 A1 | 10/2019 | Bonnell |
| 2020/0151276 A1 | 5/2020 | Rodrigues De Oliveira et al. |
| 2020/0257680 A1 | 8/2020 | Danyi et al. |
| 2021/0149787 A1* | 5/2021 | Nguyen .............. G06F 11/3495 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by Cito Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1490 — (row 1)
1492 — (row 2)

FIG. 14

| Service | Operation | 1540 0ms | 93ms | 186ms | 297ms | 373ms |
|---|---|---|---|---|---|---|
| ˅ frontend | /product | 373ms | | | | |

1539

OPERATION
        /product
        TAGS
          client                    "ios"    1550
          environment         "prod"
          http.method         "GET"   1551
          http.status_code    200
          http.url              "http://frontend/product"
          incident             "pubsub_errors"
          ios.version         "v1.1.0"
          k8s.io/cluster/name  "us-east-1-cluster"
          k8s.io/container/name  "front-end"
          k8s.io/namespace/name  "us-east-1-namespace-2"  1552
          k8s.io/pod/name    "frontend-daliuytgq-dd58f"
          region               "us-east-1"
          sampler.param      true
          sampler.type       "const"
          status.code        0
          tenant-level       "bronze"
          version             "76c81d"
        PROCESS
          hostname         "util-svc-synthetic-load-generator-7c88bbf4fb-fts96"
          ip                   "100.96.12.172"
          opencensus.exporterversion  "Jaeger-Java-0.33.1"

1546

|frontend        parse-request     15ms
˅|frontend  1547  request/GetProducts  30ms
 productcatalogservice/GetProducts  29ms
        OPERATION   1545
   1538  /GetProducts
        TAGS
          environment         "prod"   1560
          http.method         "GET"   1561
          http.status_code    200
          http.url              "http://productcatalogservice/GetProducts"
          k8s.io/cluster/name  "us-east-1-cluster"
          k8s.io/container/name  "productcatalogservice"
          k8s.io/namespace/name  "us-east-1-namespace-2"  1562
          k8s.io/pod/name    "productcatalogservice-18iodsfh27-r234t"
          products_returned  115
          region               "us-east-1"
          status.code        0
          tenant-level       "bronze"
          version             "deb52c"
        PROCESS
          hostname         "util-svc-synthetic-load-generator-7c88bbf4fb-fts96"
          ip                   "100.96.12.172"
          opencensus.exporterversion  "Jeager-Java-0.33.1"

FIG. 15A

Node_Health Exemplars:

| svc_name | env | pod | code | operation | trace_ids | Exemplar type |
|---|---|---|---|---|---|---|
| frontend | prod | frontend-d aliuytgq-d d58f | 200 | /product | "ff0558ae875 a250e" | request |
| product catalog service | prod | productcat alongservi ce-18iodsf h27-r234t | 200 | /GetProduct | "ff0558ae875 a250e" | request |

Edge_Health Exemplars:

| from service name | to service name | from pod | to pod | from operation | to operation | trace_ids | Exemplar type |
|---|---|---|---|---|---|---|---|
| frontend | product catalog service | front end-d aliuy tgq -dd58f | product catalog service-18iodsfh 27-r234t | /Product | /GetProduct | "ff0558ae875 a250e" | request |

FIG. 15C

☐ = error span

CONFIGURING AUTOMATED WORKFLOWS FOR APPLICATION PERFORMANCE MONITORING

CROSS-REFERENCE TO RELATED APPLICATIONS

The present application claims priority to U.S. Provisional Application No. 63/257,056, entitled "IDENTIFYING THE ROOT CAUSE OF A FAILURE OBSERVED IN CONNECTION TO A WORKFLOW," filed Oct. 18, 2021, by Sakshi Garg et al., all of which are hereby incorporated by reference in their entirety.

BACKGROUND

Computer systems may run applications or services that are provided via a server or cloud computing environment. A client computer system may send a request to a server that retrieves application installation files in an underlying database. The applications or services may be developed and deployed as a single unit or as multiple units, such as a collection of microservices. Applications that are developed as a single unit may be monolithic applications that include a user interface and data access codes combined into a single program from a single platform. Monolithic applications are self-contained and independent from other computing applications. With the advent of cloud computing, however, these large centralized monolithic systems are being decoupled and distributed to address scalability needs and to allow companies to deliver value faster.

Microservices or a "microservices architecture" are used in a software development method wherein software applications are developed as a suite of independently deployable smaller cooperating services. The cooperating services run processes and communicate to serve a business goal to form an enterprise application. More specifically, in a microservices architecture, an application is developed as a collection of small services; each service implements business capabilities, runs in its own process and communicates via Application Program Interfaces ("APIs"), e.g., hypertext transfer protocol (HTTP) APIs, or messaging. Each microservice may be deployed, upgraded, scaled and restarted independent of other services in the application, typically as part of an automated system, enabling frequent updates to live applications without impacting end customers.

With the rise of cloud native applications, which include microservices, there has been a shift in the manner in which software is built and deployed, and also in the manner in which it is monitored and observed. Microservices-based applications have to operate within environments of dramatically increased complexity and many more layers of abstraction compared to previous generations of monolithic applications. Compared to monolithic applications, microservices architectures generally introduce complexity in network communication, feature short lifecycles and require resiliency in dynamic environments.

Diligent application performance monitoring (APM) is needed on the part of developers of microservices-based applications to ensure that their software delivers a steady baseline of performance. APM typically involves carefully managing the performance, availability and user experience of software applications. Using APM-based tools, software developers for microservices-based applications monitor different aspects of the software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed in a cloud architecture.

Computing operations of the instrumented software may be described by spans and traces. The spans and traces are produced by various instrumented microservices in an architecture and are communicated to an analysis system that analyzes the traces and spans to enable a software developer to monitor and troubleshoot the services within their software.

As companies begin to increasingly rely on microservices architectures, they run into operational complexity and struggle to efficiently monitor their environments. Conventional microservices-based environments are complicated because they include many micro-transactions that are handled by a variety of hosts, containers and infrastructure platforms. One of the challenges associated with microservices architectures, for example, is computing metrics from significant amounts of span and trace data generated by various services in an application owner's architecture, and using the generated metrics to detect problematic conditions associated with network performance, an erroneous process, a failing service, etc. Another related challenge is providing relevant information associated with the problem in the event that a software developer decides to perform a more in-depth investigation.

Traditional monitoring and troubleshooting tools, designed as symptom-based solutions with single purpose capabilities, are simply unable to keep up with tracking the performance of dynamic cloud native applications and analyzing the significant amounts of span and trace data they generate. Conventional monitoring tools also are unable to group and track trace and span data associated with discrete client functions or client flows. For example, conventional monitoring tools also typically do not provide clients with the ability to customize the manner in which spans or traces pertaining to particular client functions are grouped together. Further, conventional monitoring tools do not provide clients the ability to attribute the root cause of failure on a workflow or a trace to a particular service or span. Thus, systems that can efficiently and accurately monitor microservices architectures and microservices-based applications, and aggregate the collected information in a meaningful way, are the subject of considerable innovation.

BRIEF DESCRIPTION OF THE DRAWINGS

In the drawings:

FIG. 14 is a table illustrating an exemplary manner in which selected tags for each service in a cross-service span pair may be mapped to tag attributes and stored as part of a memory-resident data object associated with an edge in the service graph, in accordance with implementations of the monitoring service disclosed herein.

FIG. 15A illustrates an exemplary on-screen GUI showing a visual representation of a portion of an exemplary trace illustrating a cross-service call, in accordance with implementations of the monitoring service disclosed herein.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an implementation of the monitoring service disclosed herein.

DETAILED DESCRIPTION

Figure 1A:
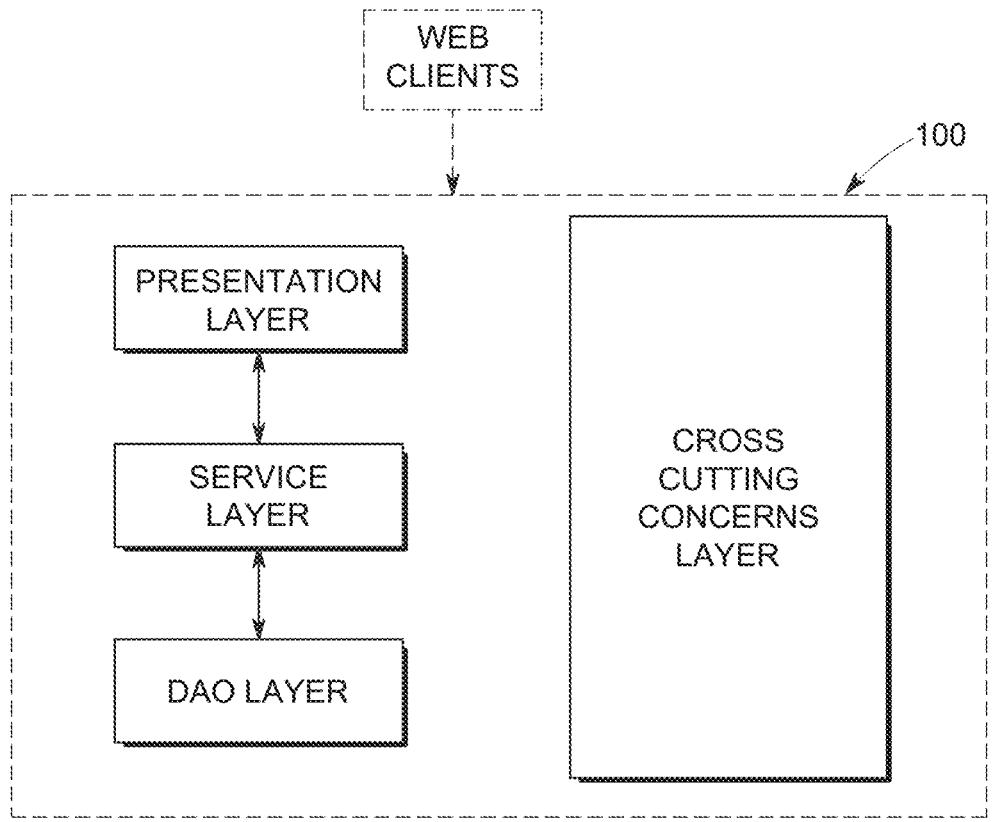
FIG. 1A illustrates an exemplary monolithic multi-layer architecture.

Implementations are described herein according to the following outline:
   1.0 Terms
   2.0 General Overview
   3.0 Data Collection
      3.1 Logs, Traces and Metrics
   4.0 Multiple Modalities for Storing and Analyzing Data
      4.1 Metric Time Series
         4.1.1 Real-Time Monitoring Using Metric Time Series Data
      4.2 Metric Events
         4.2.1 Metric Events Data Generation and Persistence
      4.3 High-Fidelity Data 5.0 Using Workflows to Monitor Client Processes or User-Interactions
  5.1 Rule-Based Configuration of Workflows
  5.2 Computing Monitoring and Trouble-shooting Metrics for Workflows
  5.3 Identifying the Root Cause of a Failure in a Workflow and a Trace 1.0 Terms The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one implementation, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the client instrumenting the software, a document involved in the request, an infrastructure element used in servicing a request, etc.

The term "tags" as used herein generally refers to key:value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "leaf span" is a childless span. As noted above, each span typically comprises information identifying its parent span. If a span in a trace that is not identified or referenced by an other span as a parent span, the span is considered a leaf span.

A "leaf error span" is a span that is the last span of a chain of error spans and does not have a child span that is also an error span. A leaf error span may be a childless span, in which case it would also be a "leaf span." A leaf error span may, however, have a child span, but that child span is not an error span.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

A "client" as used herein generally refers to a user of a monitoring service (e.g., the monitoring service 306 shown in FIG. 3) for monitoring and diagnosing problems associated with a distributed application.

Figure 3:
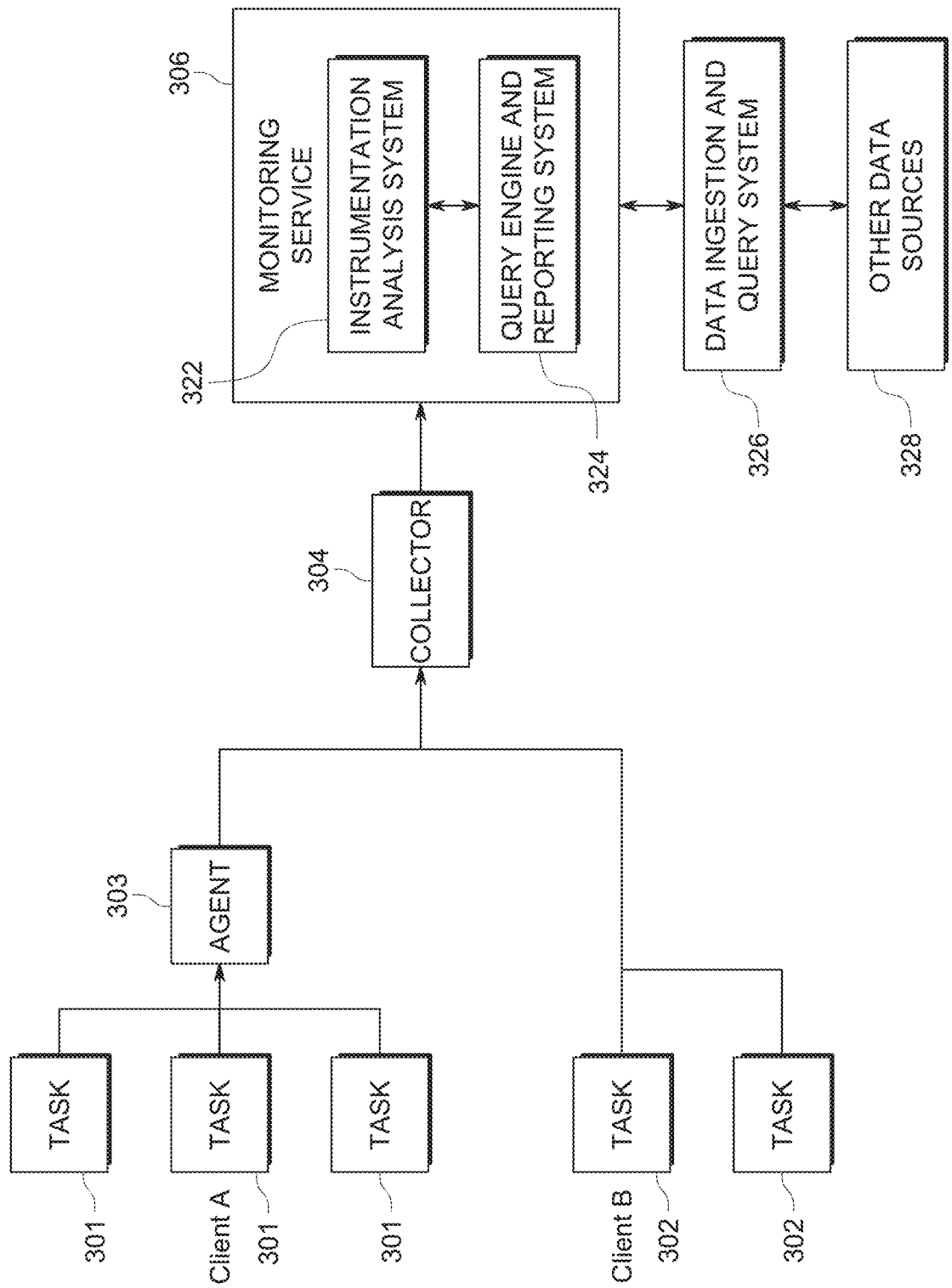
FIG. 3 is a flow diagram that illustrates the manner in which trace data may be collected and ingested for further analysis within a computer system, in accordance with implementations of the monitoring service disclosed herein.

A "user" as used herein generally refers to a user of the distributed application being monitored using the monitoring service (e.g., the monitoring service 306 shown in FIG. 3).

2.0 General Overview

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
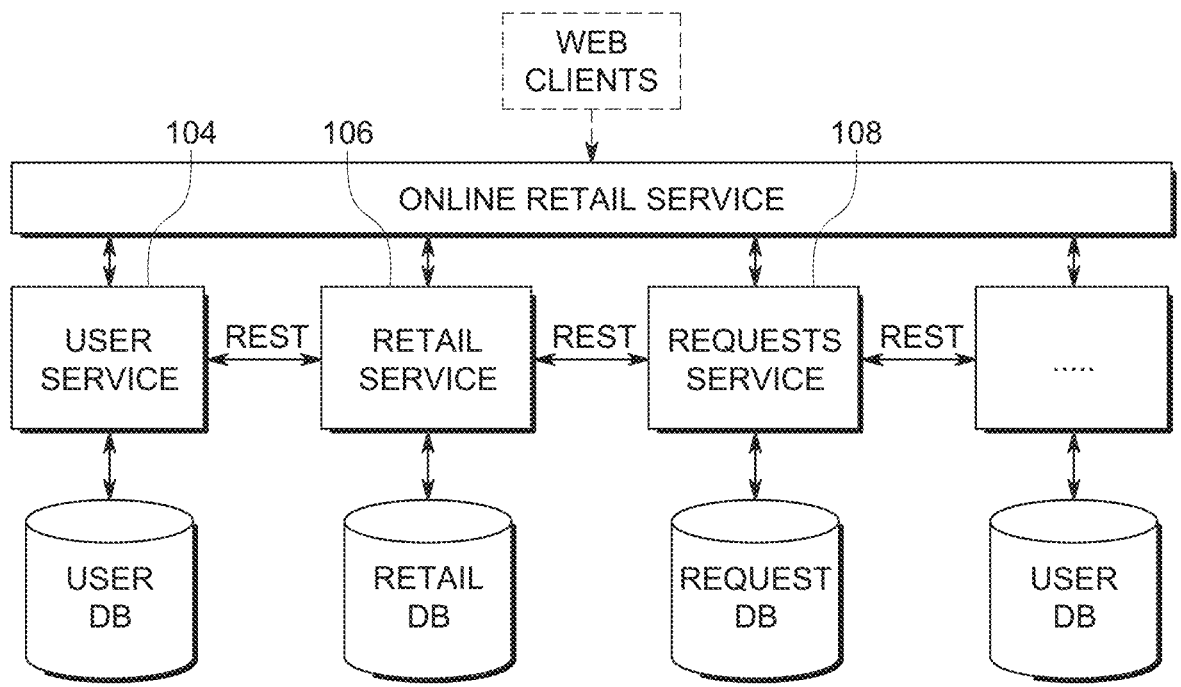
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors. These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

APM-based methods such as distributed tracing monitor the speed at which transactions are performed both by end-users and by the systems and network infrastructure that support a software application, providing an end-to-end overview of potential bottlenecks and service interruptions. This typically involves the use of a suite of software tools—or a single integrated SaaS or on-premises tool—to view and diagnose an application's speed, reliability, and other performance metrics in order to maintain an optimal level of service.

Figure 2A:
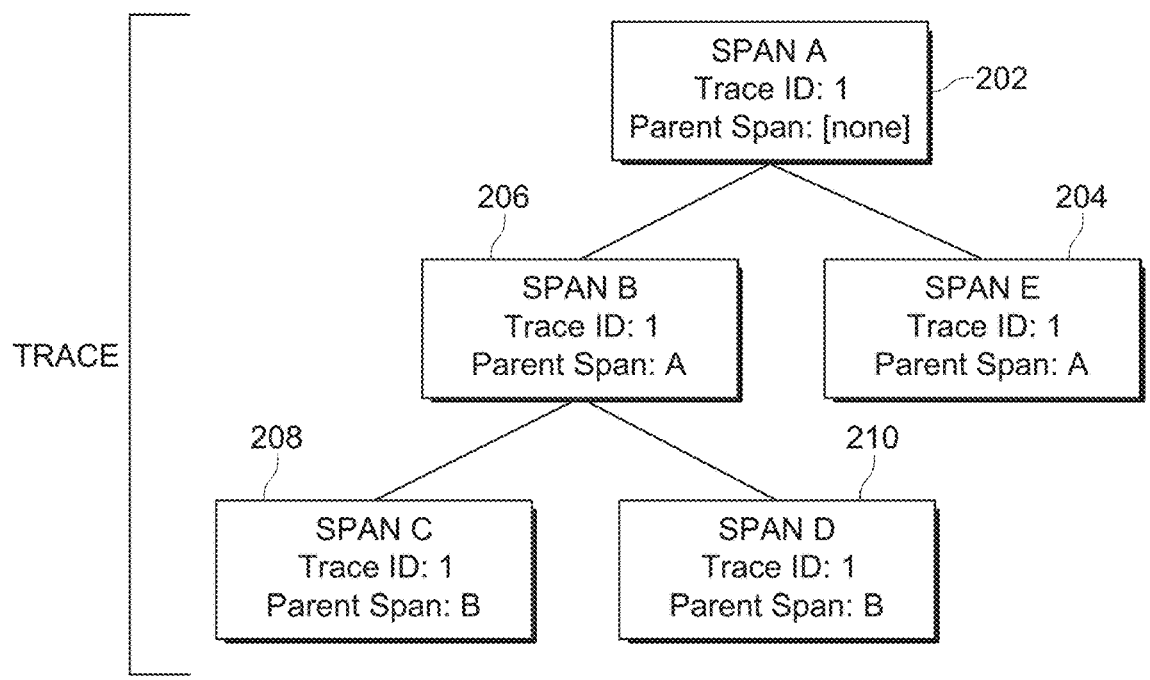
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
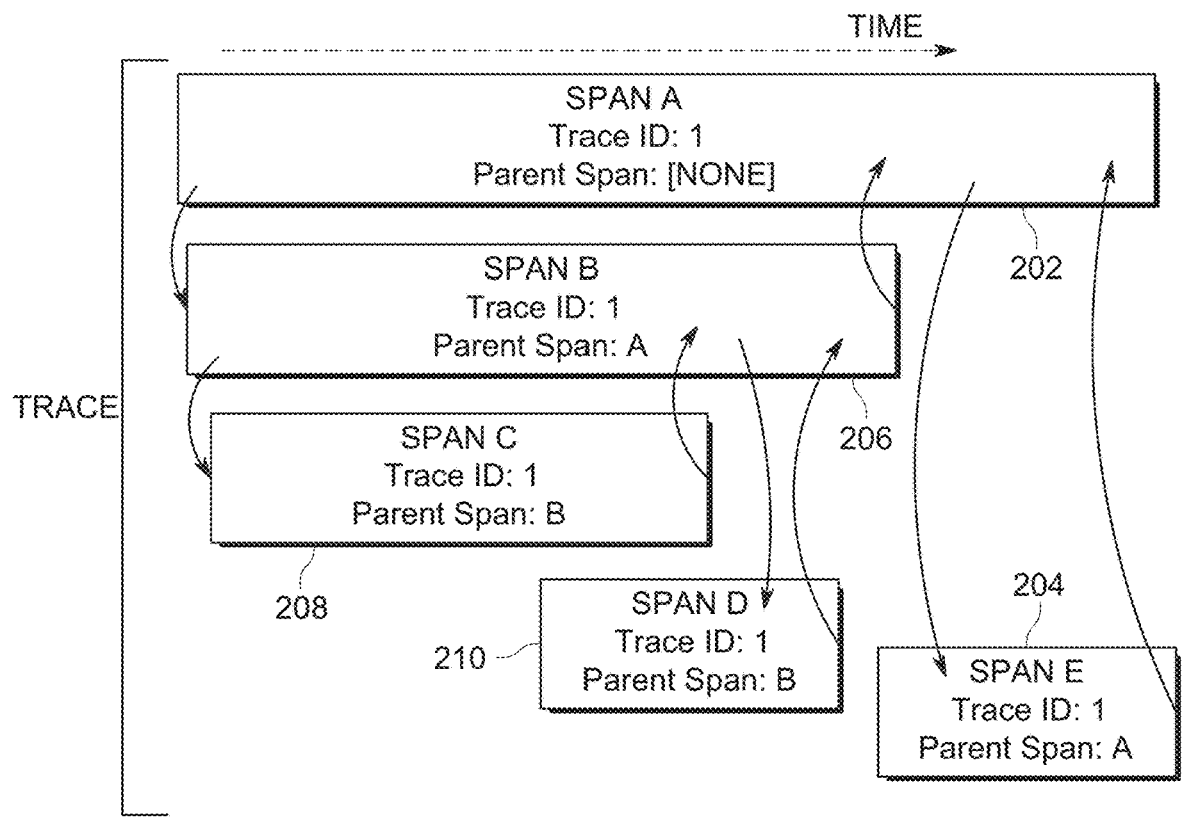
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

More specifically, when a user first interacts with an application that is instrumented for application performance monitoring, for example by clicking the checkout button on an application to generate a backend application programming interface (API) call, that request is assigned a unique trace ID. As the request moves sequentially through the system, every operation performed on it, called a "span" or a "child span," is tagged with the initial trace ID, as well as its own unique ID, plus the ID of the operation that originally generated the current request. In other words, every span associated with a particular trace is encoded with data about the microservice process performing that span, and a trace is a collection of related spans.

3.0 Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the client instrumenting the software, a document involved in the request, an infrastructure element used in servicing a request, etc.

The instrumentation handles the creating of unique trace and span IDs, tracking duration, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

FIG. 3 is a flow diagram that illustrates the manner in which trace data may be collected and ingested for further analysis within a computer system, in accordance with an implementation of the monitoring service disclosed herein. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an implementation, the collector 304 may consolidate data from several client devices and combine the data to send to the monitoring service 306. For example, the collector 304 may comprise a server that receives data streams internally from different client devices and, periodically, sends the combined data in batch form to the monitoring service 306. This allows efficiency of external communication from the enterprise.

In an implementation, the monitoring service 306 receives and analyzes the span data for monitoring and troubleshooting purposes. It should be noted that, in addition to monitoring service 306, tracing data might also be simultaneously transmitted to other types of storage and monitoring back-end services, e.g., a data ingestion and query system 326.

In one implementation, the monitoring service 306 may be a Software as a Service (SaaS) based service offering. Alternatively, in another implementation, it may also be implemented as an on-prem application. The monitoring service 306 receives the observability data collected by the collector 304 and provides critical insights into the collected trace data to a client, who may be an application owner or developer. In an implementation, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information and/or values of metrics sent by different clients. As noted previously, task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an implementation, the tasks (e.g., tasks 301 and 302) and the collector 304 may send data to the monitoring service 306 by invoking an API supported by the monitoring service 306 and the instrumentation analysis system 322. In one implementation, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one implementation, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" or a "service map" herein) to represent information regarding the traces and spans received from a client. Alternatively, the query engine and reporting system 324 may be configured to respond to specific statistical queries submitted by a developer regarding one or more services within a client's application.

3.1 Logs, Traces and Metrics

As mentioned above, the shift from monolithic applications to microservices-based architectures has increased the usefulness of analyzing traces in a distributed system. In one or more implementations, the tracing data may be coupled with log data and/or metrics data, in order to provide clients with a more complete picture of the system. For example, the trace data may be coupled with log or other data from the data ingestion and query system 326. In one implementation the data ingestion and query system 326 may be comprised within the monitoring service 306.

One example of a data ingestion and query system 326 is the event-based data intake and query SPLUNK® ENTERPRISE system developed by Splunk Inc. of San Francisco, California. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one implementation the other data sources 328 may be associated with the same clients (e.g., Client A and Client B) that generate the trace data received by the monitoring service 306.

The SPLUNK® ENTERPRISE system is particularly useful for analyzing data which is commonly found in system log files, network data and other data input sources. In another example, the data ingestion and query system 326 may be an on-premises application or based on a distributed or cloud-based service.

In one implementation, the trace data may be ingested into the data ingestion and query system 326, or may be coupled with outputs from the data ingestion and query system 326 e.g., from searches that may be based on trace data and run on the data ingestion and query system 326. In some implementations, the data ingestion and query system 326 described above may be integrated with or into the monitoring service 306 that analyzes trace data, e.g., the monitoring service 306. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data ingestion and query systems 326 described above. In some implementations data ingestion and query system 326 may be configured to generate metrics data from the trace data received from the collector 304. Additionally, other implementations may use a stream processor that may perform transformations and other operations on incoming data prior to, concurrently with, and/or as an alternative to, ingestion of the data. In some implementations, the system may also be configured to ingest metrics data and may be optimized to ingest, query and generate insights from metrics data.

In other implementations, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to a instrumentation analysis engine, where metrics may be aggregated, queried and alerted.

As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

4.0 Multiple Modalities for Storing and Analyzing Application Performance Monitoring (APM) Data APM methods such as distributed tracing are used to profile and monitor applications, especially those built using a microservices architecture, at the backend of a website or application. Historically, there have been several challenges associated with implementing an analytics tool such as the monitoring service 306 within a heterogeneous distributed system. One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, implementations of the monitoring service (e.g. monitoring service 306) disclosed herein allow clients of the monitoring service the ability to ingest up to 100% of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

Implementations of the monitoring service disclosed herein also sessionize and store up to 100% of the spans received from the client in real time. Implementations of the monitoring service disclosed herein comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is accounted for and there is no data loss as a result of sampling.

Implementations of the monitoring service disclosed herein further allow a client to store and analyze the trace data using multiple modalities of analysis. In one implementation, a first modality comprise converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a client. Because the metric time series are created without paying a time penalty associated with sessionization, they can be used to perform real-time monitoring with sub-second resolution and generate alerts within two to three seconds if a condition is violated. Further, the real-time metrics associated with the metric time series modality may also be referred to as "monitoring metric sets."

In one or more implementations, a second modality of analysis sessionizes the incoming spans and supports deriving higher-cardinality metrics (as compared with metric time series data) for a selected set of indexed tags, e.g., client-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been pre-generated using the sessionized trace data to efficiently respond to queries submitted by a client. The aggregated metrics provide a client visibility into the performance of services within a microservices-based application. The metric events modality may deprioritize speed as compared to the metric time series to provide a client resolution into a larger set of indexed tags. As such, responses provided by the metric events modality are typically slightly slower (e.g., 45 seconds to 1 minute) as compared with the sub-second response rates of the metric time series. Further, the higher-cardinality metrics associated with the metric events modality may also be referred to as "troubleshooting metric sets."

In one or more implementations, the metric events modality may also keep track of exemplary traces associated with a pre-configured set of indexed tags. The tags to be indexed may be pre-selected by the client or the monitoring platform. The Trace IDs may be used to retrieve the associated traces and analysis on the actual traces may be performed to generate more particularized information, e.g., span duration, span count, span workload percentage, etc. for each span in a given trace. In one implementation, once the traces are retrieved, an analysis may be run on an arbitrary set of tags (in addition to the pre-configured indexed tags).

Additionally, in one or more implementations, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an implementation, the three modalities may be supported by the monitoring platform simultaneously by storing ingested trace data using three different formats, wherein each format corresponds to one of the three available modalities of analysis. Note that implementations of the monitoring service disclosed herein are not restricted to three discrete data sets. The data sets for the different modalities may overlap or may be saved as part of a single data set. When a client submits a query, the monitoring platform may determine which of the data sets is most suitable for addressing the query. Thereafter, the monitoring platform executes the query against the selected data set to deliver results to the client. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
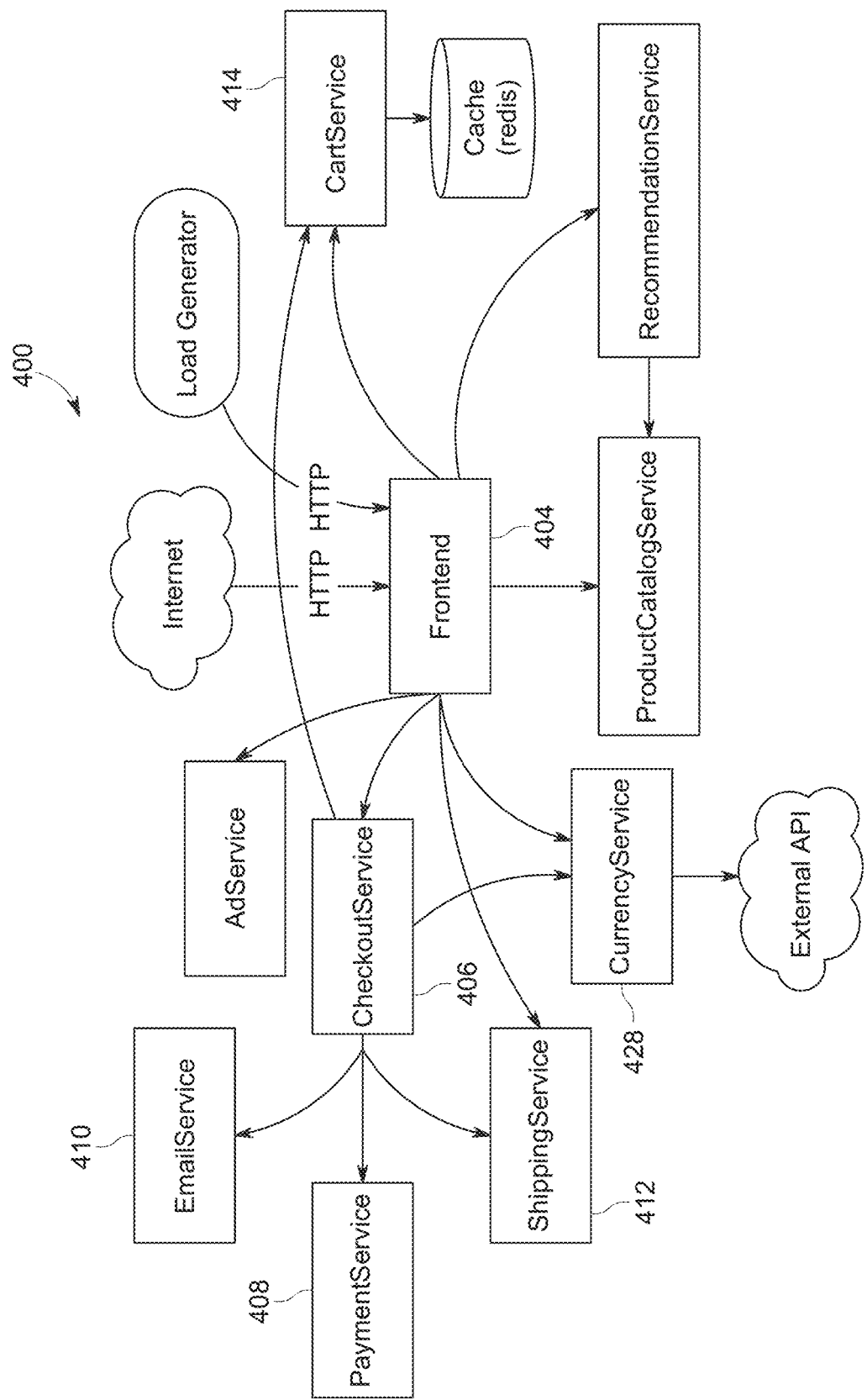
FIG. 4 illustrates components of an exemplary microservice application for an online retailer.

FIG. 4 illustrates components of an exemplary microservice application for an online retailer. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note, that a given request submitted by a user to the website would involve a subset of the services available and, typically, a single request would not result in a call to each of the services illustrated in FIG. 4.

As mentioned above, a request that the user initiates would generate an associated trace. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modalities of storing and querying trace data with the flexibility of switching between the different modalities depending on the level of detail required to respond to a client's query.

Referencing FIG. 4 again, an owner of the application 400 may, for example, need varying degrees of detail regarding the services in the application. For example, the application owner may need to monitor certain metrics (e.g., RED metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access the full trace(s) associated with the request from the Frontend service 404 to the CheckoutService 406 to perform a more detailed analysis. Each of the requests requires a different degree of detail extracted from the span and trace information.

In one implementation, the metric time series modality allows the client to monitor RED metrics associated with a given service, e.g., CheckoutService 406 in the online retailer's application in real-time. In one implementation, the metric time series modality can also be configured to deliver real-time alerts to a client based on each of the RED metrics, e.g., anomalies related to the request rate, error rate, or latency (duration).

If the client needs Service Level Indicators (SLIs) pertaining to certain indexed tags related to the call between Frontend service 404 and CheckoutService 406 for a given time duration, the metric event modality may enable the client to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with implementations of the monitoring service disclosed herein, associates the selected tags indexed from the incoming span data (e.g., the same indexed tags used for performing metrics extraction) with Trace IDs for exemplary traces. The Trace IDs may be used to retrieve the exemplary traces associated with indexed tags. Thereafter, the monitoring platform may analyze the exemplary traces to generate more particularized information, e.g., span duration, span count, span workload percentage, etc. for each span in a given trace. For the example of FIG. 4, if the client requires a performance summary for the spans generated by the call made from the Frontend service 404 to the CheckoutService 406, the associated query submitted by the client may access the data set associated with the metric event modality. Using the Trace IDs corresponding to the indexed tags, the monitoring platform may then perform the computations necessary on the corresponding exemplary traces to provide the client further information regarding the span performances. In an implementation, the client may also be able to extract meaningful information from the unindexed tags associated with the spans generated by the call using the exemplary traces.

If the client wants to search all the incoming trace data associated with the call between Frontend service 404 to the CheckoutService 406, implementations of the monitoring service disclosed herein provide a third modality of analysis. In the full-fidelity modality, a full-fidelity analysis may be conducted on any dimension or attribute of the trace data. For example, the client may be able to search previously indexed or unindexed tags across each of the traces associated with the call the between the Frontend service 404 and the CheckoutService 406. The full-fidelity modality allows an analysis to be performed across any relevant trace. Conventional tracing systems are unable to provide that level of flexibility and detail for developers or application owners needing to investigate performance issues with their applications. Note that this modality of analysis may be more time-consuming because trace data may be detailed and require significant storage space.

Implementations of the monitoring service disclosed herein ingest and aggregate the span information from the online retailer's application. Further, implementations of the monitoring service disclosed herein extract information from the incoming span data and store the information using multiple formats to support multiple modalities of data analysis for a client. Each modality is configured to allow the clients access to a different format in which incoming trace information may be represented and stored, where each format conveys a different degree of resolution regarding the ingested traces to a client and, accordingly, may occupy a different amount of storage space.

Figure 5:
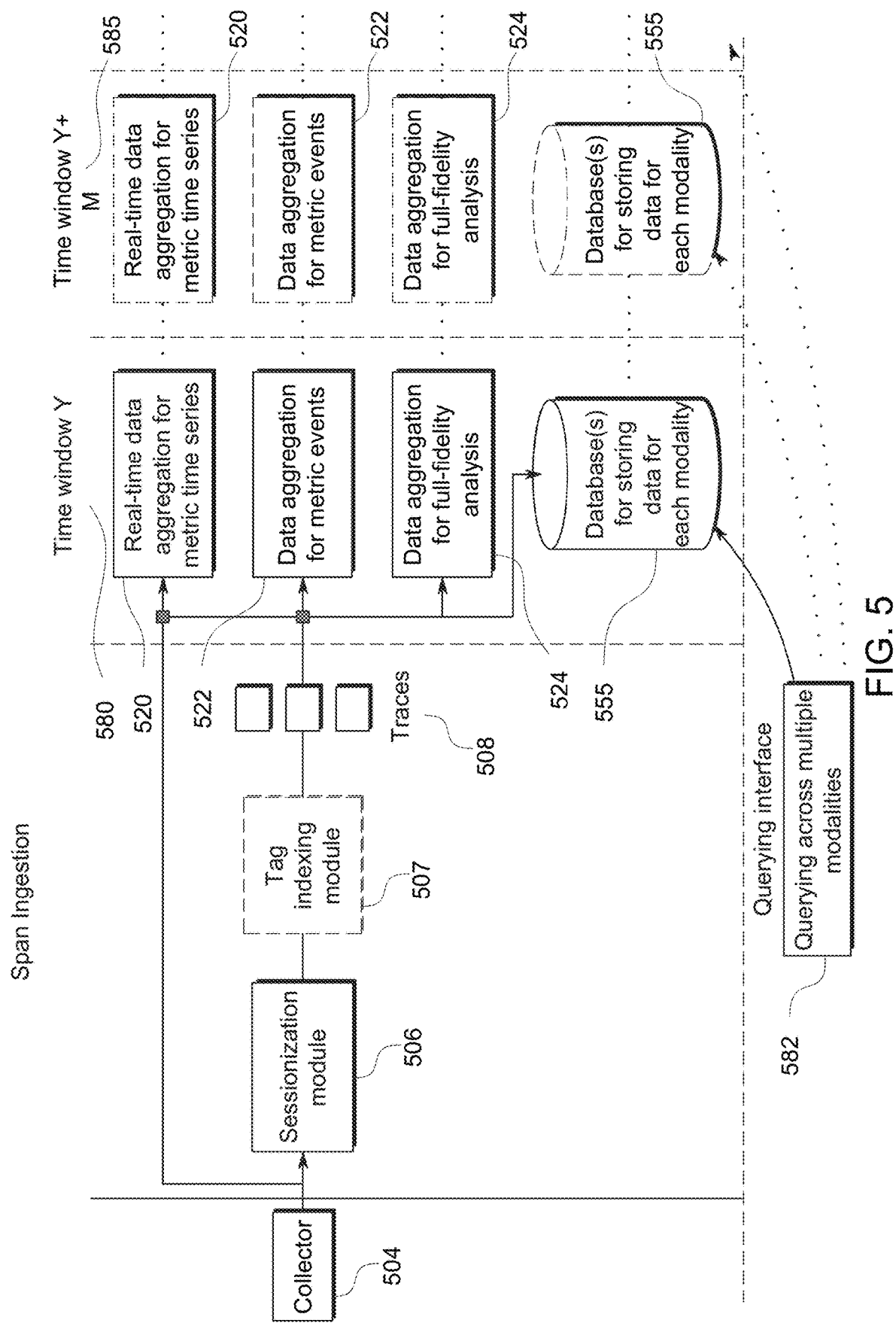
FIG. 5 is a flow diagram that illustrates an exemplary method of ingesting and aggregating span information to support multiple modalities of analysis, in accordance with implementations of the monitoring service disclosed herein.

FIG. 5 is a flow diagram that illustrates an exemplary method of ingesting and aggregating span information to support multiple modalities of analysis, in accordance with implementations of the monitoring service disclosed herein. As mentioned in connection with FIG. 3, span information is received at the monitoring service 306 from the collector (e.g., the collector 504 in FIG. 5).

As noted previously, in one implementation, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 506 is responsible for stitching together or combining the traces 508 using, among other things, the Trace IDs associated with each user-request (and typically also the Parent Span IDs of each span). Note that, in one implementation, the sessionized traces may also be inputted to the module 520 to create metric time series to track traces (separately from the time series created to track spans).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first time window (associated with time window Y 580) before transmitting the traces to modules 520, 522, or 524. Thereafter, the sessionization process may consolidate traces within the subsequent time window (associated with time window "Y+M" 585) before transmitting those traces to the modules 520, 522, or 524. It should be noted that the time windows associated with each of the modules 520, 522, and 524 may be different. In other words, the metric time series data may be collected over short time windows of 10 seconds each. By comparison, traces for the metric events modality (associated with the module 522) may be collected over 10 minute time windows.

In some implementations of the monitoring service disclosed herein, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Implementations of the monitoring service disclosed herein, by comparison, comprise an ingestion streaming pipeline that is able to ingest and consolidate all the incoming spans into traces in real time, and is further able to use advanced compression methods to store the traces. Further, implementations of the monitoring service disclosed herein are able to generate metric time series from the span data (prior to sessionizing the spans) to provide real-time monitoring and alerting of certain KPIs.

As noted above, the sessionization module 506 has the ability to collect all the traces within a first time window Y 580 using the time-stamps for the traces. Subsequently, the sessionized traces are fed to the modules 522 and 524, for the respective modes (metric events and full-fidelity) for extraction and persistence.

In one implementation, subsequent to consolidation, the trace data is indexed by an optional tag indexing module 507, which indexes one or more tags in the trace data. The tags may be client-selected tags or tags that the monitoring platform is configured to index by default. In a different implementation, tag indexing may be performed as part of data aggregation, e.g., by module 522 associated with metric events.

In an implementation, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In one implementation, data associated with each of the three modalities is generated at the time of ingestion and stored separately from each other. The structure, content, type or syntax of query submitted by a client will typically dictate which of the three modalities and corresponding data set will be selected. In one implementation, an interface through which the query is submitted may also determine which of the three modalities and corresponding data set is selected. In an implementation, there may be some commonality in the data for the three modalities in which case the storage for the data may overlap. An alternative implementation may also comprise one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an implementation, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different modality (e.g., full-fidelity) to provide the client with further details. Conventional monitoring systems, by comparison, do not provide more than a single modality or the ability to navigate between multiple modalities of data analysis.

4.1 Metric Time Series

Implementations of the monitoring service disclosed herein allow trace data to be stored and analyzed using multiple modalities of analysis. In one implementation, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a client. Because the metric time series are created without paying a time penalty associated with sessionization, they can be used to perform real-time monitoring with sub-second resolution and generate alerts within two to three seconds if some condition is violated.

4.1.1 Generating Metric Data Streams Using Span Identities

A client application associated with, for example, an online retailer's website may potentially generate millions of spans from which a monitoring platform may need to extract meaningful and structured information. To organize the significant amounts of incoming span data, in an implementation, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some implementations, the tuple used to represent the span identity may include other identifying dimensions as well. For example, if a client needs visibility into metadata tags from the spans in addition to the dimensions extracted for a base span identity by default (e.g., service, operation, kind, etc.), an extended identity may be created. An extended identity supports custom dimensionalization by a client, where dimensionalization refers to the ability to extract information pertaining to additional tags or metadata in a span. An extended identity provides a customer the ability to dimensionalize the span using pre-selected dimensions.

Conventional methods of monitoring by comparison did not offer customers the flexibility to add custom dimensions to streams of metric data. An extended identity comprises the span's base identity and additionally a map of the span's tag key: value pairs that matched a client's configuration settings. An exemplary extended identity may be represented as the following exemplary tuple: {operation, service, kind, isError, httpMethod, isServiceMesh, key ValueMap . . . }, where the key ValueMap field represents one or more additional tags or dimensions configured by the client to be extracted as part of the span's identity, e.g., customer name, member ID, etc.

By extracting information related to additional tags, higher cardinality metrics may be computed using the metric time series modality. Further, a client is able to configure alerts on the custom dimensions as well, wherein the alerts inform a client if a particular dimension has crossed some critical threshold. In alternate implementations of the monitoring service disclosed herein, the tuple used to represent a span's base or extended identity may contain fewer elements.

If the tuple of information of an incoming span happens to be the same as another span, both spans relate to the same identity. In an implementation, spans with the same base identity may be grouped together. A fixed size bin histogram is generated for each span identity to track metrics associated with the span identity. In this way the same type of spans are organized together and the client can track one or more metrics associated with each group of spans sharing a common identity. In an implementation, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one implementation, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one implementation, may be aggregated by a monitoring platform to provide a client meaningful information regarding the application being monitored.

Figure 6:
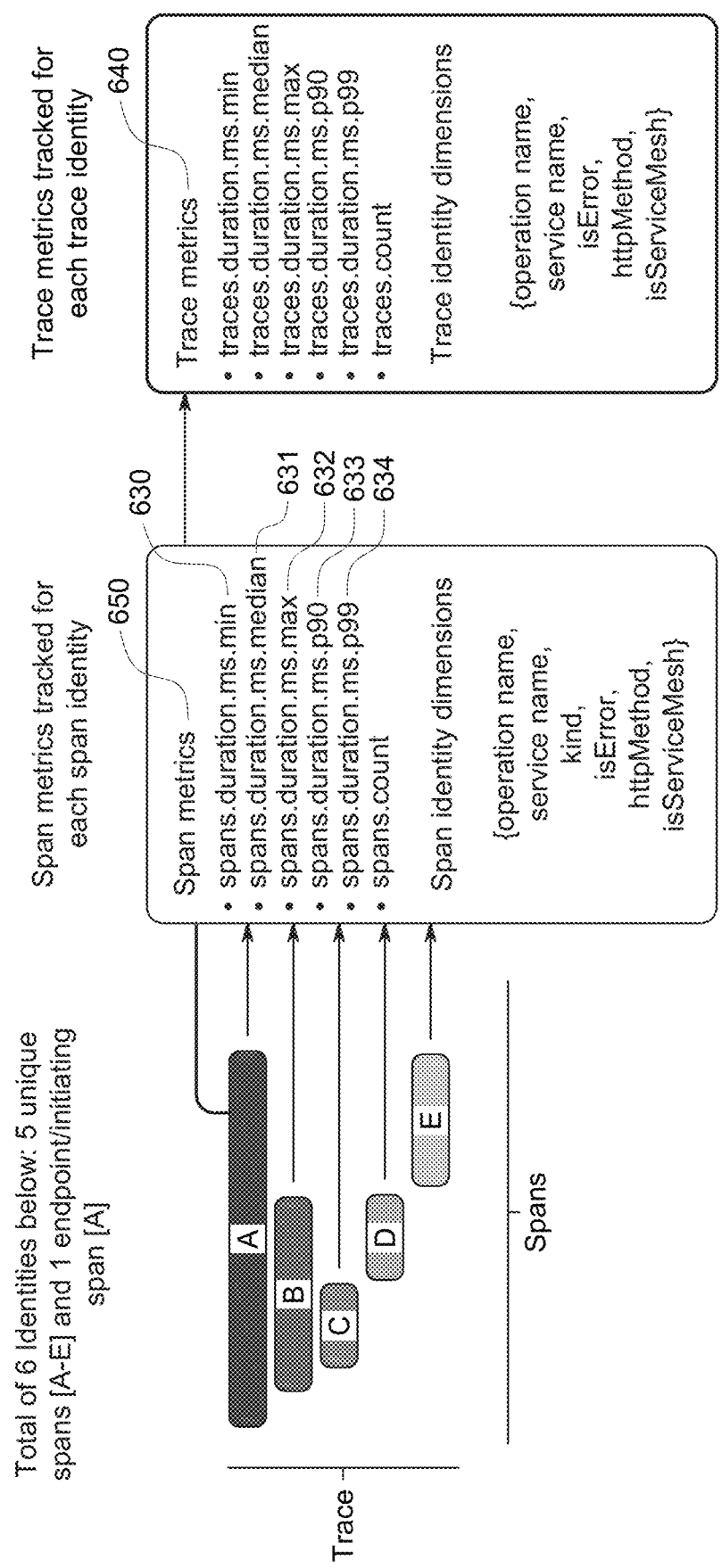
FIG. 6 illustrates the manner in which span metrics and trace metrics are generated, in accordance with implementations of the monitoring service disclosed herein.

FIG. 6 illustrates the manner in which span metrics and trace metrics are automatically generated, in accordance with implementations of the monitoring service disclosed herein. FIG. 6 illustrates 5 unique spans (A-E) including a root span (an initiating span) A. In an implementation, each group of spans identified by the same span identity is associated with one or more span metrics 650. For example, a minimum span duration 630, a median span duration 631, a maximum span duration 632, a p90 latency value 633, a p99 latency value 634 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the client has configured additional metadata to be extracted from the spans.

As shown in FIG. 6, in an implementation, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
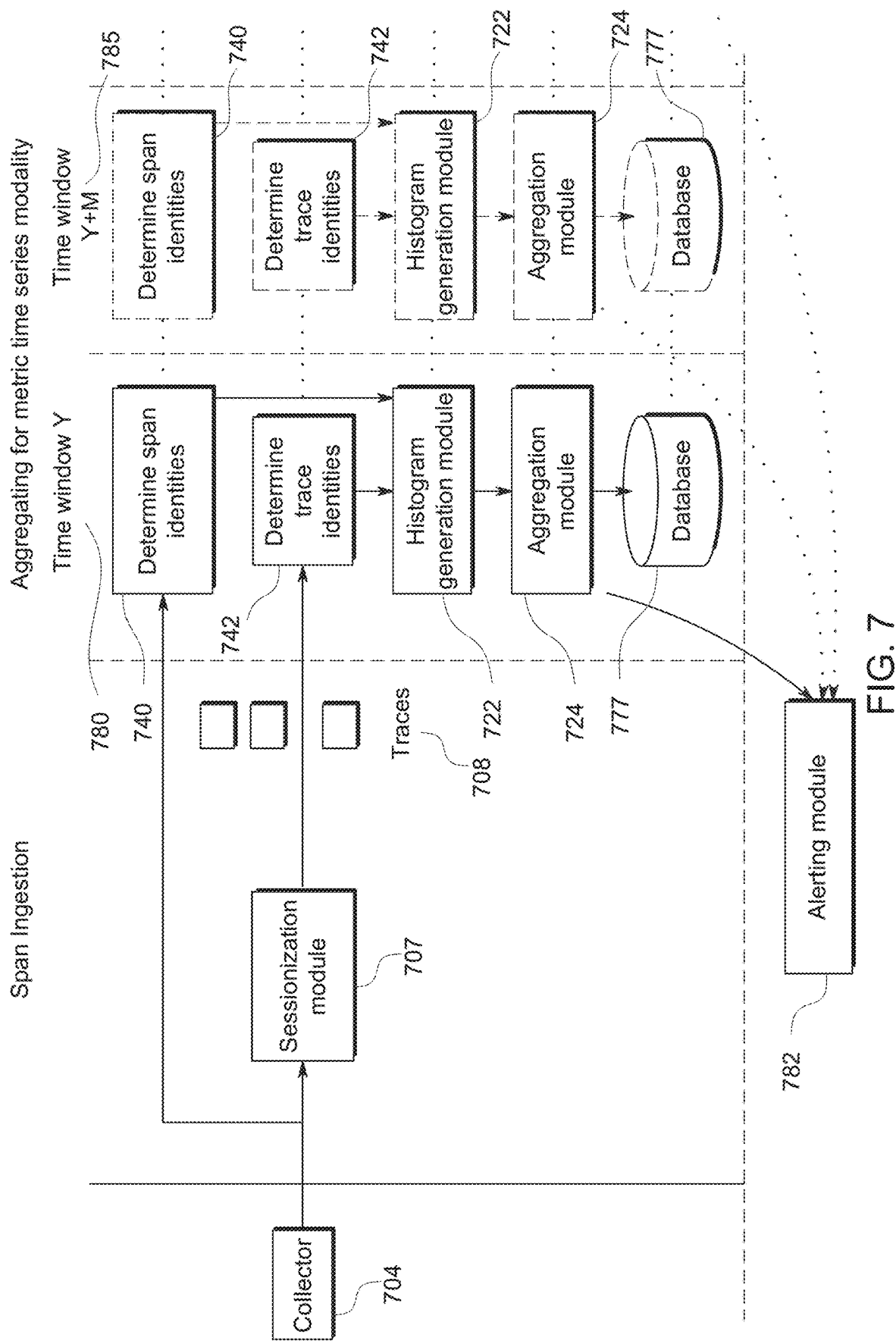
FIG. 7 is a flow diagram that illustrates an exemplary method of generating metric time series from ingested spans, in accordance with implementations of the monitoring service disclosed herein.

FIG. 7 is a flow diagram that illustrates an exemplary computer implemented method of generating metric time series from ingested spans, in accordance with implementations of the monitoring service disclosed herein. As mentioned previously, incoming spans are received at a monitoring service from a collector 704. Prior to being sessionized, span identities are generated for the spans and the spans with identical base identities are grouped together by module 740.

In one implementation, a histogram generation module 722 generates a histogram respective to each span identity.

The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 780 (e.g., 10 seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including client-configured custom metrics, corresponding to each type of span to the analytics engine.

In one implementation, the span information is also combined into traces 708 using a sessionization module 707 as discussed in connection with FIG. 5. The sessionization process may consolidate traces (from spans) within a first minute window (associated with time window Y 1480). Thereafter, the sessionization process may consolidate traces within the subsequent window (associated with time window "Y+M" 1485). Trace identities are determined for the sessionized traces 708 using module 742 after which the trace metrics (as discussed in connection with FIG. 6) are determined using the histogram generation module 722 in a process similar to the manner in which span metrics are generated.

In an implementation, an aggregation module 724 may aggregate the periodic metric data from the histogram generation module 722 and create metric time series from the data for each span identity. In some implementations, the aggregation module 724 may generate quantized data streams from the metric data received from the histogram generation module 722. The quantized data stream has data values occurring periodically at fixed time intervals.

In one implementation, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams.

In one implementation, the aggregation module 724 may, for example, perform aggregations on the various metric time series to provide real-time monitoring of certain higher priority endpoints in the application. For example, aggregations may be performed to determine request, error and latency metrics for certain designated services. In order to do that, the aggregation module 724 may, for example, aggregate values across all span identities that are associated with the designated service.

Further, in some implementations, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In one implementation, the histograms generated by the histogram generation module 722 may be stored in database 777. In an implementation, the histogram data may be stored as parquet-formatted files.

In an implementation, the instrumentation analysis system 322 compares durations of a set of similar spans (e.g., spans for the same span identity) with the tags associated with these spans and determines whether there are any patterns for a given tag. As discussed above, the analysis system 322 generates a histogram that may represent a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

4.1.2 Real-Time Monitoring Using Metric Time Series Data

Figure 8:
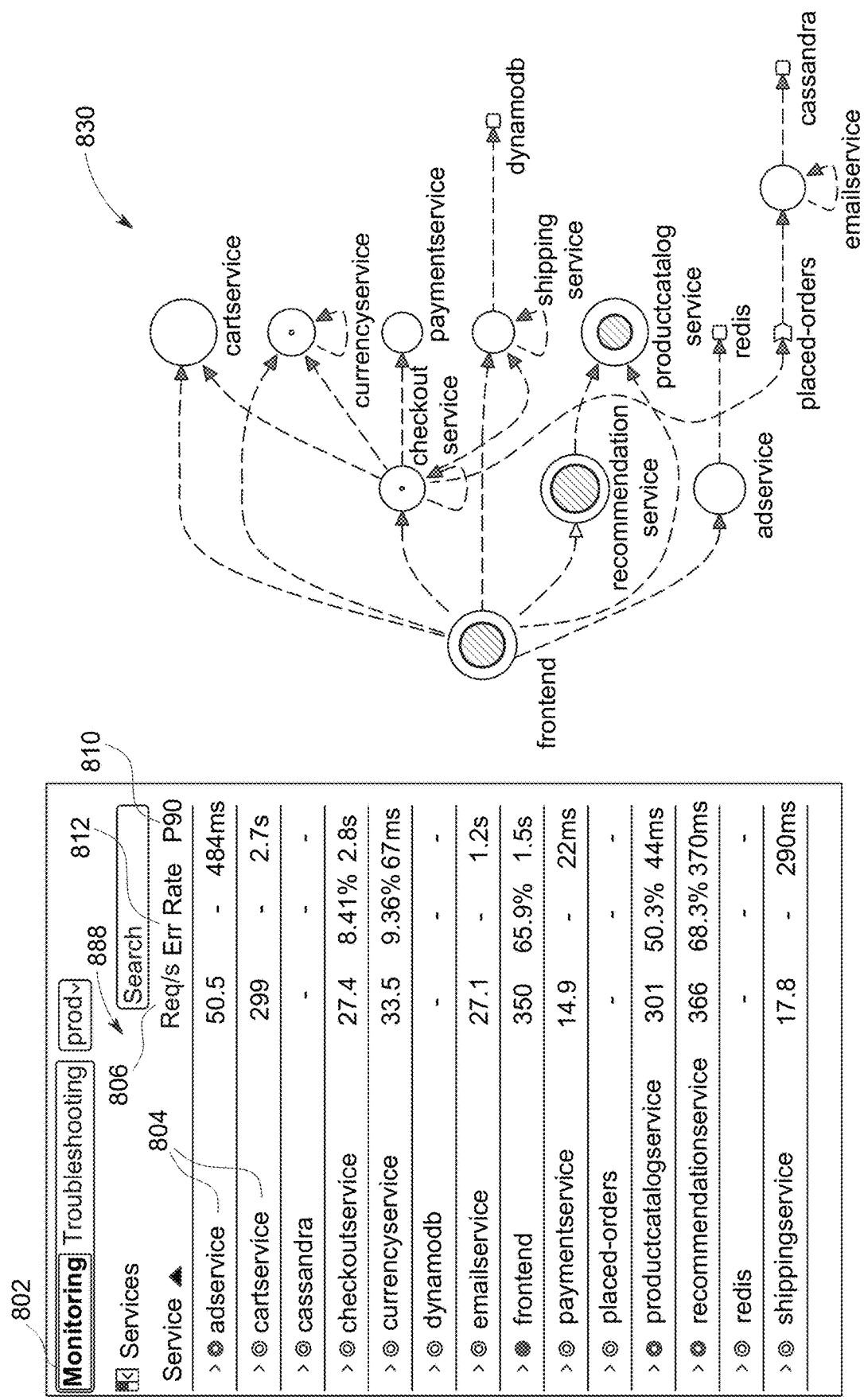
FIG. 8 illustrates an exemplary on-screen GUI illustrating a monitoring mode for an application displaying metric values aggregated from metric time series data, in accordance with implementations of the monitoring service disclosed herein.

FIG. 8 illustrates an exemplary on-screen GUI illustrating a monitoring mode for an application displaying metric values aggregated from metric time series data, in accordance with implementations of the monitoring service disclosed herein. In one implementation, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an implementation, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 830. The service graph 830 facilitates visualizing cross-service relationships between services comprised within the application and external to the application (as will be discussed further in connection with the metric events modality). In an implementation, the service graph may be created using information gleaned from the metric time series data aggregated by the aggregation module 724 discussed in connection with FIG. 7.

By ingesting up to 100% of the incoming spans from the client software and implementing monitoring service 306 as a Software as a Service (SaaS) based service offering, implementations of the monitoring service disclosed herein advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, implementations of the monitoring service disclosed herein retain high-fidelity information related to all the incoming spans for deeper analysis. The metadata retained provides a client the ability to filter based on certain dimensions and services that would not have been possible using conventional monitoring systems. Further, the metadata retained may be used in conjunction with data sets for other modalities such as metric events and full-fidelity to allow a client to provide a thorough investigation of an alert.

In one implementation, using, for example, the "service," "operation," and "kind" fields in the tuple, the aggregation module 724 (from FIG. 7) may be able to determine span identities associated with cross-service calls. Spans associated with inter-service calls are of interest to a client because they provide client information regarding the manner in which two services within an application are interacting. Implementations of the monitoring service disclosed herein are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one implementation, if a client identifies a span identity associated with a cross-service call or a span identity associated with a high value operation, the client may create an extended identity for the corresponding span identities and supplement those identities with additional custom dimensions to be monitored. For example, the client may want to monitor a customer name association with such spans. The client may simply reconfigure the analytics engine to extract the additional customer name dimension as part of the spans' extended identity.

Retaining span information associated with incoming spans provides a client additional metadata to perform intelligent processing. In an implementation, the client may only collect data pertaining to select operations. In other words, the client may filter out data pertaining to select operations that are of less interest to a client.

The number of unique span identities may typically roughly correlate with the number of unique operation names present on the span. In an implementation, the client is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a client. For example, spans associated with calls that a service makes to operations internal to the service do not convey information and can be filtered. Accordingly, additional resources can be directed towards processing spans associated with services and operations that are of greater interest to a client. Conventional monitoring systems by comparison would not have the flexibility to selectively focus on spans associated with high value services or operations by filtering out the less valuable spans.

4.2 Metric Event Modality

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a client.

Figure 9:
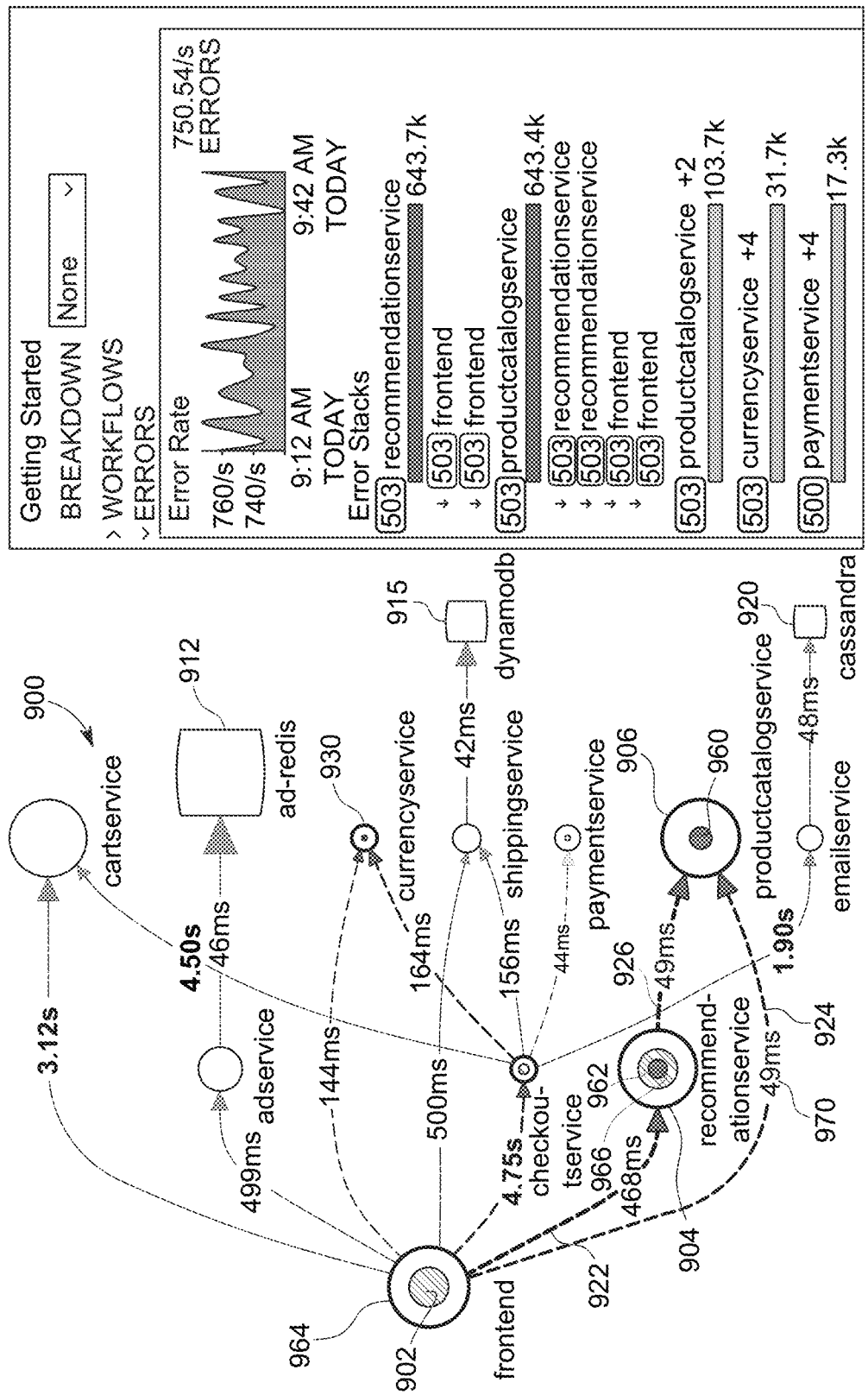
FIG. 9 illustrates an exemplary on-screen GUI comprising an interactive topology graph for an application created from the aggregated metric events data, in accordance with implementations of the monitoring service disclosed herein.

Implementations of the monitoring service disclosed herein use the aggregated rows of metrics data created in association with the metric events modality to generate a full-context application topology graph using the metric events data (e.g., by module 522 in FIG. 5). FIG. 9 illustrates an exemplary on-screen GUI comprising an interactive topology graph for an application created from the aggregated metric events data, in accordance with implementations of the monitoring service disclosed herein. The service graph facilitates visualizing cross-service relationships between services comprised within the application and external to the application. The exemplary GUI of FIG. 9 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 9 illustrates an on-screen GUI comprising an interactive full-context service graph 900, which is constructed for an exemplary microservices-based application using the metrics data generated in connection with the metric events modality. Each circular node (e.g., nodes associated with services 902, 904 and 906 of FIG. 9) represents a single microservice. Alternatively, in an implementation, a circular node may also represent a group of multiple microservices, where the GUI for the monitoring platform (associated with, for example, the monitoring service 306) provides a client the ability to expand the node into its sub-components.

In an implementation, services that are part of the client's application may be represented differently from services that are external to the client's application. For example, circular nodes (e.g., nodes associated with services 902, 904 and 906) of the exemplary application represented by service graph 900 are associated with services comprised within the client's application. By contrast, squarish nodes (e.g., nodes associated with databases dynamodb 915, Cassandra 920, ad-redis 912) are associated with services or databases that are external to the client's application.

A user may submit a request at the front-end service 902; the user's request at the front-end service 902 may set off a chain of subsequent calls. For example, a request entered by the user at the front end of the platform may generate a call from the front-end service 902 to the recommendation service 904, which in turn may generate a further call to the product catalog service 906. As noted previously, a chain of calls to service a request may also comprise calls that a service makes to internal sub-functions or operations within the same service.

Each edge in the service graph 900 (e.g., the edges 922, 924 and 926) represents a cross-service dependency (or a cross-service call). The front-end service 902 depends on the recommendation service 904 because it calls the recommendation service 904. Similarly, the recommendation service 904 depends on the product catalog service 906 because it makes a call to the product catalog service 906. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some implementations, the GUI comprising service graph 900 may be configured so that the nodes themselves provide a visual indication regarding the number of errors that originated at a particular node versus errors that propagated through the particular node but originated elsewhere. In an implementation, the high-cardinality metrics data aggregated in association with the metric events modality may be used to compute the number of errors that are used to render the nodes of the service graph.

For example, as shown in the service graph of FIG. 9, the front-end service 902 makes calls to the recommendation service 904. Errors may be generated at the recommendation service 904 not only in response to calls from the front-end service 902, but also in response to calls that the recommendation service 904 makes to itself (e.g., in response to sub-functions or operations that are part of recommendation service). For such errors, the recommendation service 904 would be considered the "originator" for the error. The recommendation service 904 also makes calls to the product catalog service 906 and these calls may result in their own set of errors for which the product catalog service 906 would be considered the error originator. The errors originating at the product catalog service 906 may propagate upstream to the front-end service 902 through the recommendation service 904; these errors would be observed at the recommendation service 904 even though the recommendation service 904 is not the originator of those errors.

It is appreciated that conventional monitoring technologies would not provide adequate means for a client to distinguish between errors that originated at the recommendation service 904 versus errors that propagated through the recommendation service 904 but originated elsewhere. By performing computations using the metrics data associated with the metric events modality, implementations of the monitoring service disclosed herein are able to render a service graph that visually indicates critical information regarding the services in an architecture, e.g., number of requests between services, the number of errors generated by a service, number of errors for which the service was the root cause, etc. The service graph 900 allows clients the ability to visually distinguish between errors that originated at the recommendation service 904 as compared with errors that simply propagated through the recommendation service 904. As shown in FIG. 9, the node associated the recommendation service 904 comprises a solid-filled circular region 966 and a partially-filled region 962, where the region 966 represents errors that originated at the recommendation service 904 while the region 962 represents errors that propagated through the recommendation service 904 but originated elsewhere (e.g., at the product catalog service 906).

Similarly, solid-filled region 960 within the node associated with the product catalog service 906 represents the errors that originated at the product catalog service. Note that the errors returned by the product catalog service 906 originated at the product catalog service. In other words, the product catalog service 906 does not have errors from another downstream service propagating through it because it does not make calls to another service that is further downstream in the execution pipeline. Conversely, the front-end service 902 comprises a partially-filled region 964 because the errors observed at the front-end service 902 propagated to it from other downstream services (e.g., the recommendation service 904, the currency service 930, the product catalog service 906, etc.) The front-end service 902 was not the originator of errors in the example shown in FIG. 9. Note that in other implementations solid-filled regions (e.g., region 966) and partially-filled regions (e.g., region 964) may be represented differently. For example, different shades, patterns, or colors may be used to distinguish these regions from each other.

Implementations of the monitoring service disclosed herein use the aggregated rows of metrics data created for the metric events modality to determine full-fidelity SLIs associated with the services in an application (e.g., by the module 522 in FIG. 5). An SLI is a service level indicator-a defined quantitative measure of some aspect of the level of service that is provided. The SLIs are aggregated and extracted for the various services in a microservices architecture so that the behavior of applications may be understood. Most clients consider request latency-how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one implementation, the GUI comprising service graph 900 is interactive, thereby, allowing a developer to access the SLIs associated with the various nodes and edges within the application by interacting with respective portions of the service graph. Referring to FIG. 9, in an implementation, a client may be able to hover their cursor over various regions of the on-screen displayed service graph 900, including but not limited to the nodes (e.g., the nodes associated with services 904, 906 etc.) and edges (e.g., the edges 922, 926, etc.), to receive SLI-related information for the associated microservices through a pop-up window or other interface.

Figure 10:
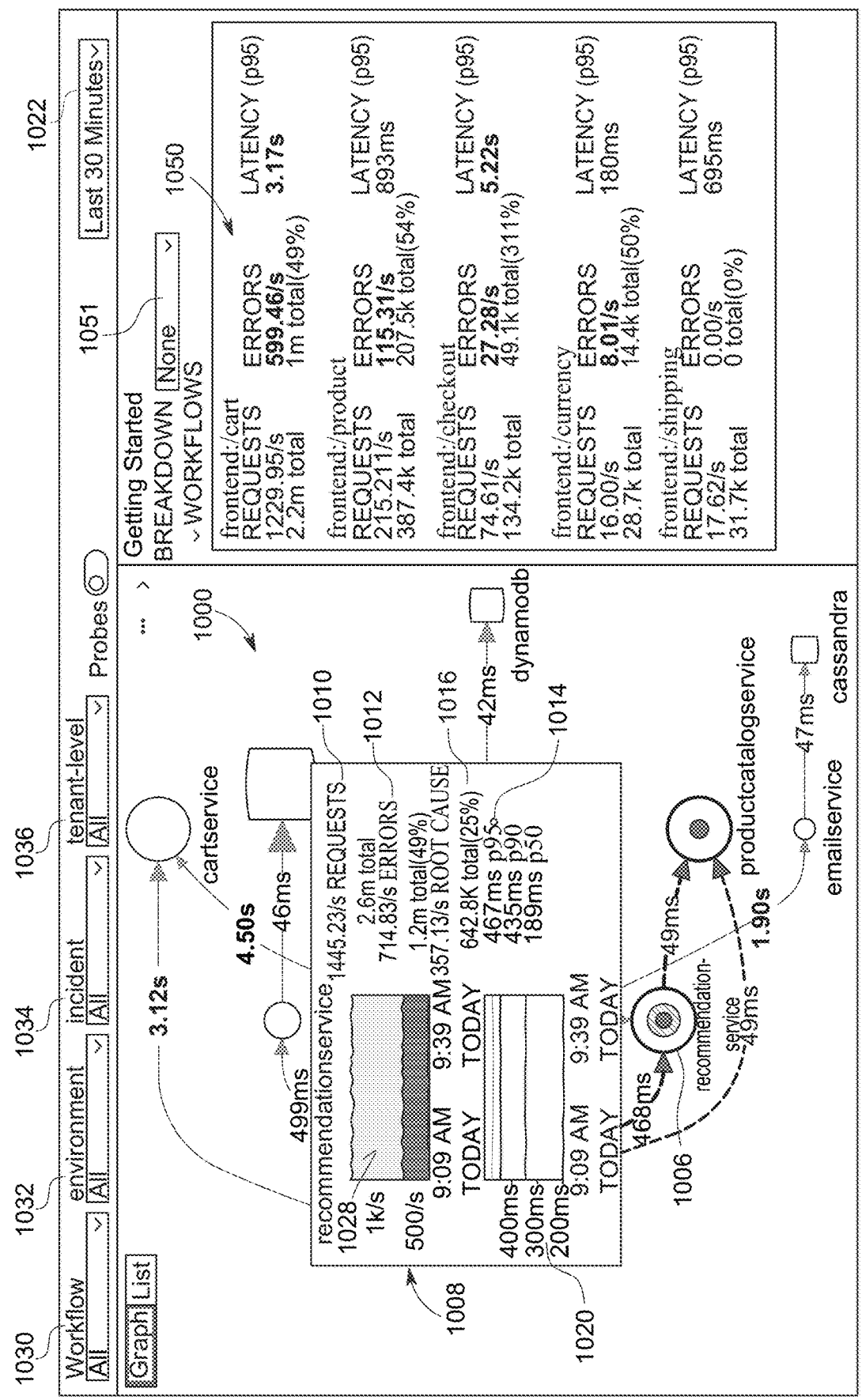
FIG. 10 illustrates an exemplary on-screen displayed GUI showing the manner in which a client may access SLIs pertaining to a service within an interactive topology graph, in accordance with implementations of the monitoring service disclosed herein.

FIG. 10 illustrates an exemplary on-screen displayed GUI showing the manner in which a client may access SLIs pertaining to a service within an interactive topology graph, in accordance with implementations of the monitoring service disclosed herein. As shown in FIG. 10, when a client hovers the cursor over the node associated with, for example, the recommendation service 1006, a pop-up window 1008 is overlaid on the service graph 1000 comprising SLIs pertaining to the recommendation service 1006. Specifically, SLIs pertaining to Requests 1010, Errors 1012 and Latency percentiles 1014 are provided. Furthermore, in an implementation, information pertaining to Root Cause 1016 is also provided to the client.

For example, the SLIs related to Requests 1010 comprise information regarding the rate of requests and number of requests serviced by the recommendation service 1006 during a specific time duration. The time duration over which the SLIs are calculated may be adjusted using drop-down menu 1022. The time duration over which SLIs are calculated may vary, for example, from 1 minute to 3 days. As indicated by the time axis on hover chart 1028, for this example, a time window of 30 minutes (from 9:09 to 9:39 a.m.) is selected.

In an implementation, the pop-up window 1008 also provides the client information pertaining to SLIs related to Errors 1012. In the example of FIG. 10, the pop-up window 1008 provides information regarding the error rate and the total number of errors that occurred during the specified time duration. The client is also provided information regarding what percentage of the total number of requests resulted in errors.

In an implementation, the pop-up window 1008 also provides the client information pertaining to Latency Percentiles 1014 and a graphical representation 1020 of the same. For example, SLI p95 indicates that for 95% of the users, the latency for servicing the requests was less than 467 ms. Latency-related SLIs also include information regarding p90 and p50 percentiles. The graphical representation 1020, in the example of FIG. 10, shows the latency information regarding the p95 percentile graphically.

In one implementation of the monitoring service disclosed herein, the pop-up window 1008 also displays information pertaining to errors for which the selected service was the root-cause. The Root Cause information 1016 includes the number of errors for which the selected service (e.g., the recommendation service 1006 in the example of FIG. 10) was the originator, the associated error rate and the percentage of the total number of requests that represents. In this way, implementations of the monitoring service disclosed herein, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1008 are computed accurately using the metrics data gathered for the metric events modality. Because implementations of the monitoring service disclosed herein are able to ingest up to 100% the incoming span data (without sampling), the SLIs are computed factoring in all the incoming data, which results in accurate measurements. For the example of FIG. 10, there were a total of 2.6 million requests served by the recommendation service 1006 at a rate of 1445.23 requests/second ("sec"). Of these, 1.2 million of the requests resulted in errors at a rate of 714.83/sec, which represents approximately 49% of the total number of requests. In this way, implementations of the monitoring service disclosed herein provide a modality of analysis that enables a client to gather critical SLIs pertaining to the recommendation service 1006 including an indication of how many of the errors originated at the recommendation service 1006.

Figure 11:
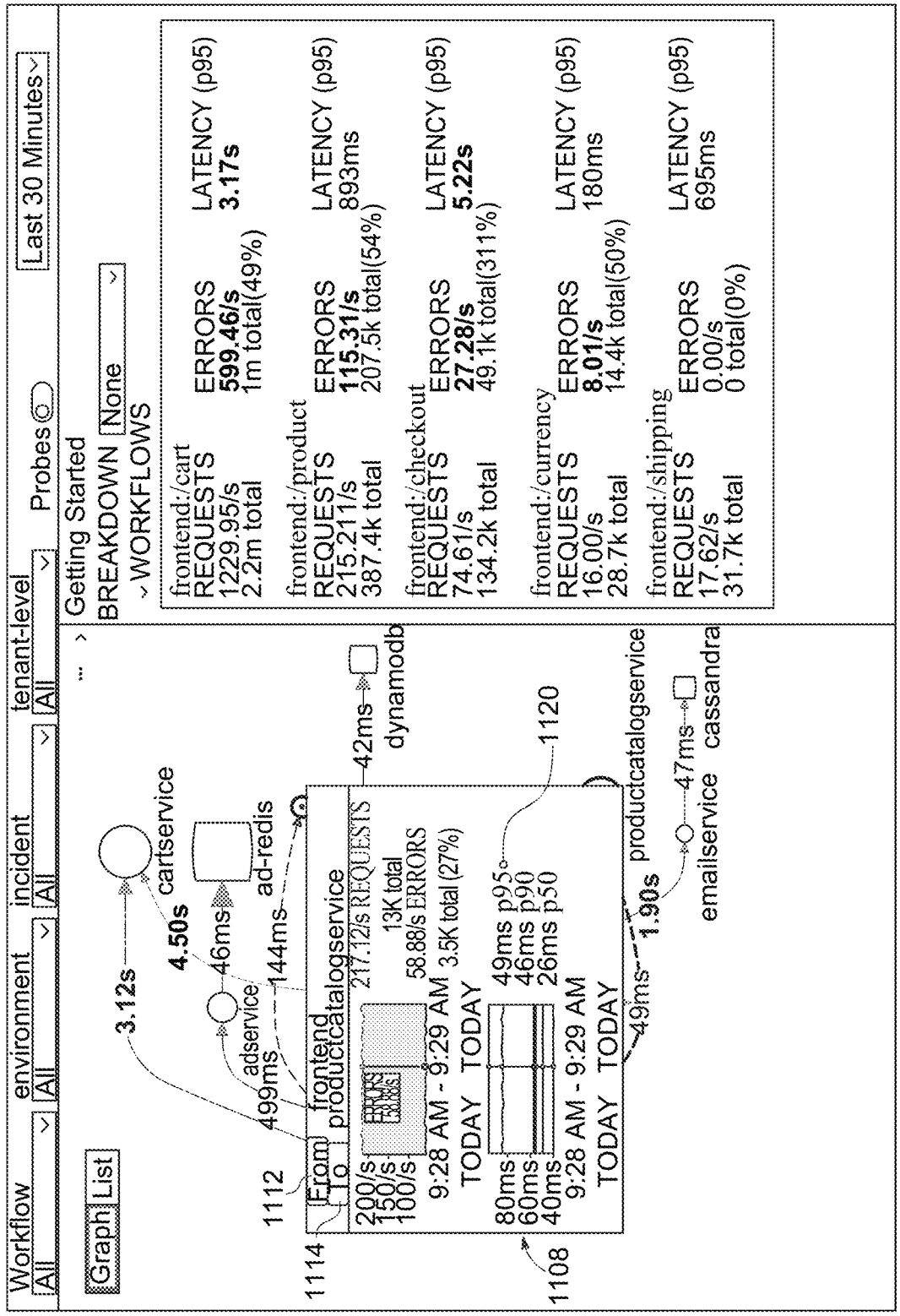
FIG. 11 illustrates an exemplary on-screen GUI showing the manner in which a client may access SLIs pertaining to an edge within an interactive topology graph, in accordance with implementations of the monitoring service disclosed herein.

FIG. 11 illustrates an exemplary on-screen GUI showing the manner in which a client may access SLIs pertaining to an edge within an interactive topology graph, in accordance with implementations of the monitoring service disclosed herein. The SLIs pertaining to edges are also computed using the metrics data associated with the metric events modality. As shown in FIG. 11, if a client hovers over or selects a particular edge, e.g., the edge 924 (as shown in FIG. 9) (which represents the cross-service dependency of the front-end service 902 on the product catalog service 906) a pop-up dialog box 1108 opens up on-screen that reports SLIs specific to the dependency. The "From" field 1112 represents the service that executes the call and the "To" field 1114 represents the service that is called (the service that the calling service depends on). As shown in the dialog box 1108, SLIs pertaining to the number of requests (or calls) that were made, the number of those that returned in errors, and the latency associated with servicing the requests are provided. It should be noted that a latency value 1120 of 49 ms shown in FIG. 11 for this particular dependency may be annotated directly on the edge of the service graph. For example, as shown in service graph 900 of FIG. 9, edge 924 of the service graph 900 in FIG. 9 indicates the latency value 970 (e.g., 49 ms) directly on the edge in the service graph allowing a client to efficiently gather information regarding latency associated with the dependency.

In an implementation, as shown in FIG. 9, the edges within the application topology graph are annotated with their corresponding latency values. In this way, implementations of the monitoring service disclosed herein efficiently compute SLI data from the metrics information aggregated for this modality and advantageously enable developers to gather meaningful and accurate information regarding cross-service dependencies directly from the service graph 900.

In one implementation, the metrics data associated with the metric events modality are used to compute accurate SLIs across multiple dimensions. Further, implementations of the monitoring service disclosed herein support high dimensionality and high cardinality tags for the metric events modality. In one implementation, the GUI of FIG. 10 may display one or more attribute (or tag) categories that comprise dimensions that may be varied across the service graph 1000. For example, attribute categories (e.g., Workflow 1030, environment 1032, incident 1034 and tenant-level 1036) may be depicted within the GUI, each of which may correspond to attributes that may be varied to compute SLIs and error-related information for different combinations of the attributes. The categories of dimensions across which the SLIs may be computed, include, but are not limited to, workflow 1030, environment 1032, incident 1034 and tenant-level 1036. Each of the categories comprises a drop-down menu with options for the different dimensions. The metrics events data allows clients to easily and rapidly compute measurements across various cross-combinations of tags or attributes.

In an implementation, the GUI may include a panel 1050 that may display SLIs across the various workflows. Further, the GUI allows clients the ability to break down the workflows across multiple different attributes using drop down menu 1051. The computations for each of the break-downs may be efficiently determined using the metrics data aggregated for the metric events mode.

Figure 12:
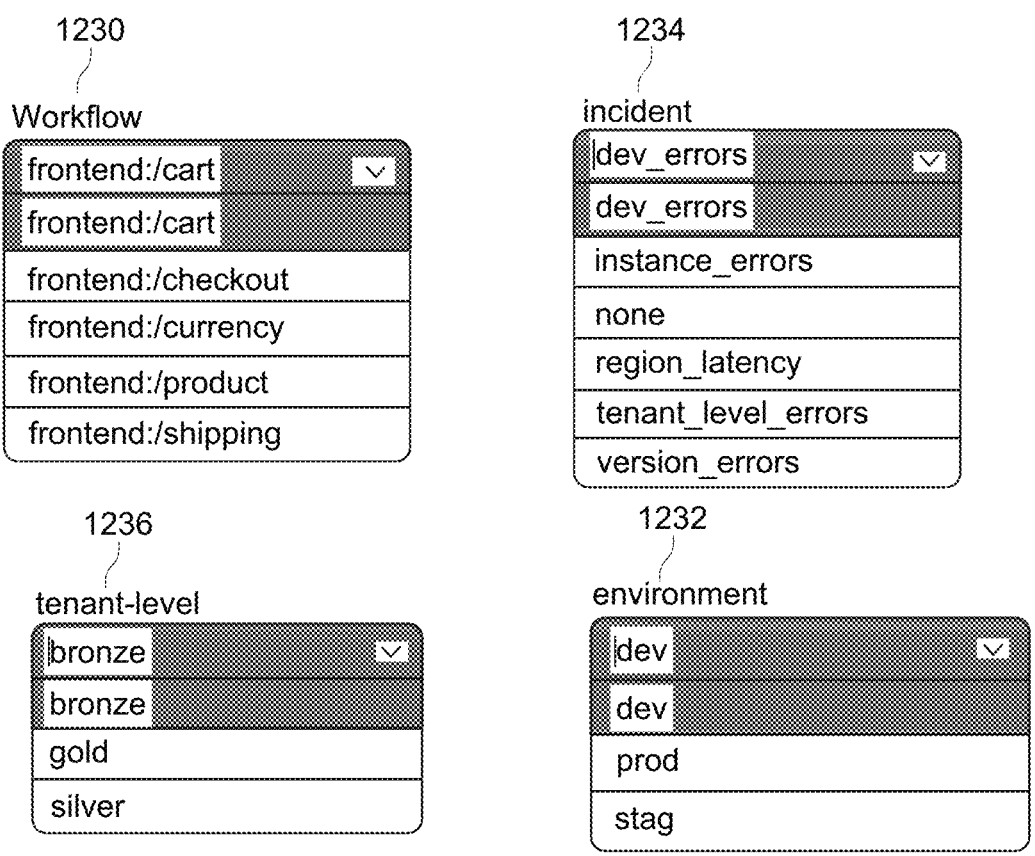
FIG. 12 illustrates on-screen displays that represent exemplary categories of dimensions across which SLIs may be computed, in accordance with implementations of the monitoring service disclosed herein.

FIG. 12 illustrates on-screen displays that represent exemplary categories of dimensions across which SLIs may be computed, in accordance with implementations of the monitoring service disclosed herein. The exemplary category of dimensions corresponds to the categories associated with drop-down menus (e.g., 1030, 1032, 1034 and 1036) discussed in connection with FIG. 10. The metrics data aggregated using the metric event modality allows clients to easily and rapidly compute measurements across various cross-combinations of attributes. Drop-down on-screen menu 1230, corresponding to workflow, illustrates different workflows specific to the application discussed in connection with FIG. 9. A "workflow" is a type of dimension of the request that was processed; a workflow may be conceptualized as a type of "global tag" that is attributed to each span in a given trace. A workflow may, for example, be associated with a type of client process or user-interaction, e.g., "checkout," that is generated on the back-end in response to a request.

Similarly, drop down on-screen menus 1234, 1236 and 1232, relating to incident, tenant-level and environment respectively, provide further categories of dimensions across which SLIs may be computed. Each of the drop down on-screen menus 1230, 1232, 1234 and 1236 comprises various dimensions (associated with the respective categories) across which aggregations may be made. For example, the client may submit a query asking for the number of requests in a trace where "Workflow=frontend:/cart" and "incident=instance_errors" and "tenant-level=gold." By aggregating metrics data associated with the indexed tags, the metric events modality is able to respond to the client's query rapidly and efficiently.

Note that SLIs may be computed for each attribute of the categories in FIG. 12 and also for each combination of attributes associated with the categories. In an implementation, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 10). In this way, implementations of the monitoring service disclosed herein enable a client to use the metric events modality to slice the application topology graph across several different attributes.

It should be noted that clients might have different attributes or dimensions that may be of interest for their respective application. In an implementation, the monitoring platform may be configured to provide insight into client-specific dimensions. Consequently, the specific attributes or dimensions available in each of the drop-down menus may vary by client.

4.2.1 Metric Events Data Generation and Persistence

Figure 13:
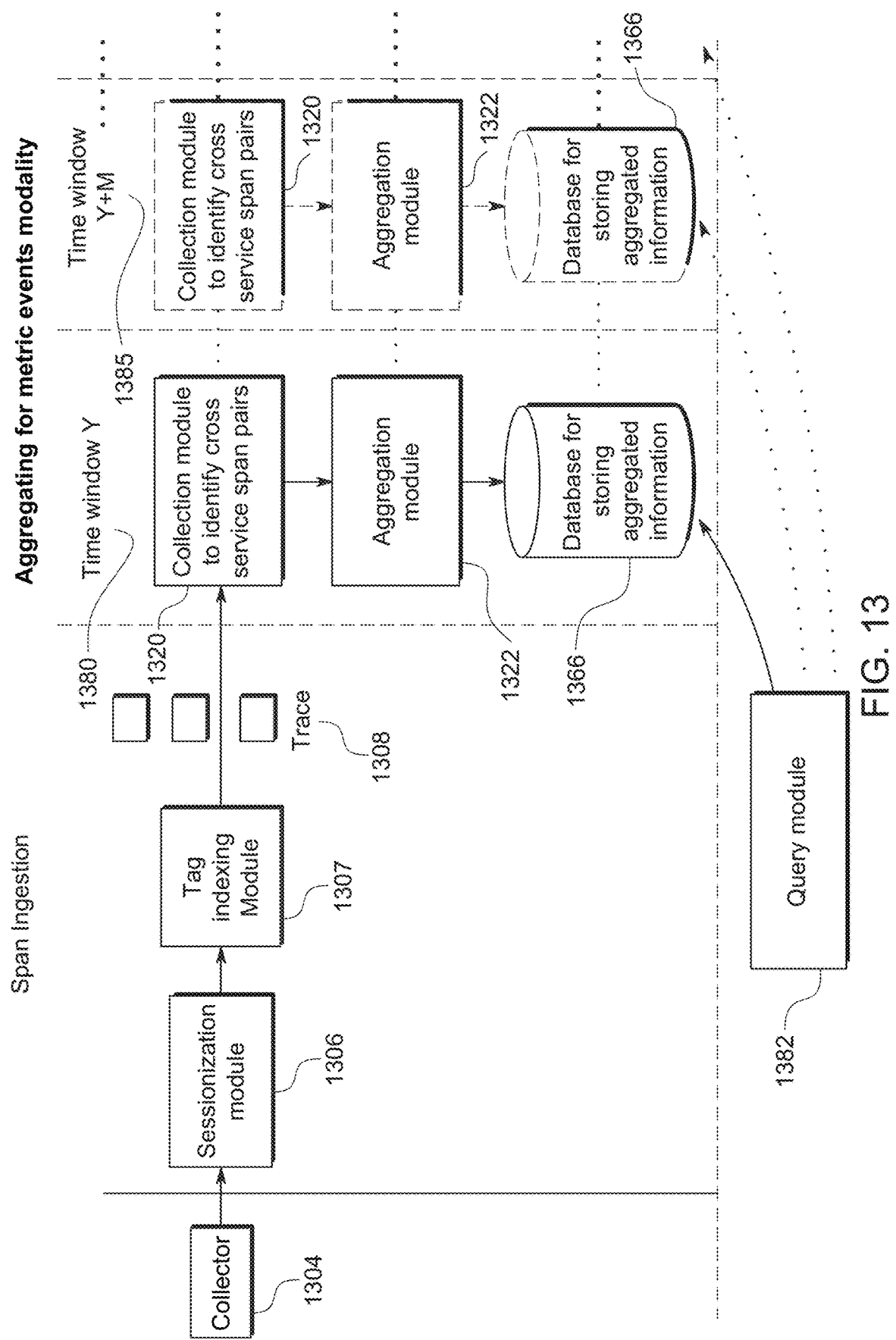
FIG. 13 is a flow diagram that illustrates an exemplary method of aggregating metrics data from ingested traces for the metric events modality, in accordance with implementations of the monitoring service disclosed herein.

FIG. 13 is a flow diagram that illustrates an exemplary method of aggregating metrics data from ingested traces for the metric events modality, in accordance with implementations of the monitoring service disclosed herein. As mentioned previously, span information is received at a monitoring service from a collector 1304. The span information is then combined into traces 1308 in real time using module 1306 in a process called sessionization as discussed in connection with FIG. 5. The sessionization process may consolidate traces (from spans) within a first time window (associated with time window Y 1380) before transmitting the traces to the collection module 1320. Thereafter, the sessionization process may consolidate traces within the subsequent window (associated with time window "Y+M" 1385).

Subsequent to consolidation, the trace data is indexed by tag indexing module 1307, which indexes one or more tags in the trace data. The tags may be client-selected tags or tags that the monitoring platform is configured to index by default. In one implementation, the metric events modality indexes a subset of tags associated with the spans of a trace, but indexes that set of tags with perfect accuracy because the metrics calculated take into account all the ingested spans.

In one or more implementations, collection module 1320 receives one or more traces 1308 generated within a predetermined time window Y 1380, and traverses the traces to identify and collect cross-service span pairs that represent cross-service calls. To collect the cross-service span pairs, the collection module 1320 identifies parent-child span pairs in a given trace where the service name for the parent and the child are different. Stated differently, the collection module 1320 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a client, e.g., to render the service graph and display the SLIs associated with the various dependencies between services. Spans associated with calls to internal operations that a service might make may not be of interest to an application owner and may, therefore, be ignored by the collection module 1320 when determining the cross-service span pairs.

It should be noted that, in one implementation, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1320 from service tiers associated with a cross-service span pair. In a different implementation, however, the tags may be extracted directly from the parent span and child span in a cross-service span pair rather than the respective service tier associated with the parent span or child span.

In one or more implementations, once the cross-service span pairs are collected and the indexed tags extracted from the respective service tiers, the collection module 1320 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services. In one implementation, the aggregation module 1366 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this implementation, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In a different implementation, the count may be maintained at the service level. Accordingly, the count may be increased each time the same cross-service span pair is encountered within the trace information ingested from the client.

The aggregation module 1322 advantageously prevents duplication by storing a single instance of each unique set of "FROM" tag attributes and "TO" tag attributes for a given cross-service span pair with an associated count in the storage module 1366. The information in the storage module 1366 may be accessed by querying module 1382 where the querying module 1382 determines that the query is associated with the metric events modality. The querying module 1382 may, for example, be associated with the query engine and reporting system 324 discussed in FIG. 3.

The aggregated cross-service "FROM" and "TO" tag attribute sets and associated count values stored in the storage module 1366 may be used by the querying module 1382 to respond to queries in accordance with the metric events modality. Note that the collection and aggregation process is repeated for subsequent time windows (including window Y+M 1385) after time window Y 1380. In this way, the aggregation process is performed over time. This allows the metric events modality to deliver query results over varying time durations (as discussed, for example, in connection with the drop-down menu 1022 in FIG. 10).

FIG. 14 is a table illustrating an exemplary manner in which selected tags for each service in a cross-service span pair may be mapped to tag attributes and stored as part of a memory-resident data object associated with an edge in the service graph, in accordance with implementations of the monitoring service disclosed herein. As noted above, in one or more implementations, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one implementation, one or more edge data objects similar to the one shown in FIG. 14 is used to persist the data for the metric events modality (in addition to node data objects which will be discussed in connection with FIG. 15B).

The table of FIG. 14 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region-us-west) (span.kind=client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 14 illustrates information for two unique sets of "FROM" and "TO" tag attributes. Edge 1490 is associated with a TO-type attribute of "region-us-east" while edge 1492 is associated with a TO-type attribute of "region=us-west." Because the two sets of "FROM" and "TO" attributes are not identical, a separate count is maintained for each. The edge 1490 has an associated count of 2, while the edge 1492 has an associated count of 1. To determine the total number of requests or total count associated with the cross-service call from Service A to Service B, the number of counts for each set of "FROM" and TO" tag attributes for an associated cross-service call may be summed up. In the example of FIG. 14 then, a total of 3 requests is computed to occur between Service A and Service B.

In one implementation, data sets for the metric events mode are stored as row of metrics extracted from the indexed tags in the service tiers, where each row is associated with either an edge or a node in the service graph. In an implementation, the edges on the service graph (e.g., the edges 922 and 926 of FIG. 9) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an implementation, this grouping may be performed using "group by" statements in a query language, e.g., SQL. In one implementation, the value of the number of requests between two services may be used to determine the thickness of the edge between the two services in the service graph.

In one implementation, the nodes (e.g., nodes associated with services 902, 904, 906) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an implementation, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one implementation, the value of the number of requests may also be used to determine the size of the node when rendering the service graph.

In an implementation, the "TO" type tag attributes for rendering the nodes may be aggregated separately from the "FROM" and "TO" tag attribute sets aggregated for rendering the edges (as will be discussed in connection with FIG. 15B). In the exemplary table of FIG. 14, information for Service B may be determined, for example, by analyzing the "TO" type tag attributes in the table.

FIG. 15A illustrates an exemplary on-screen GUI showing a visual representation of a portion of an exemplary trace illustrating a cross-service call, in accordance with implementations of the monitoring service disclosed herein. As shown in FIG. 15A, front-end service 1539 makes a call to product catalog service 1538. Accordingly, the front-end service 1539 and the product catalog service 1538 comprise a cross-service span pair. Note that spans 1540, 1546 and 1547 may be part of the service tier for front-end service 1539. Accordingly, even though the call is made by the span 1547 ('frontend: request/GetProduct') to span 1545 ('productcatalogservice: /GetProducts), indexed tags associated with the front-end service 1539 may also be extracted from the spans that are part of the service tier for the front-end service 1539. In one implementation, the first matching tag within a service tier is extracted. For example, indexed tag "environment=prod" 1550 may be extracted from the span 1540, even though it is repeated in the spans 1546 and 1547 because the span 1540 comprises the first matching instance of the tag 1550. Assuming tags "environment" (referred to herein as "env"), "http.status_code" (referred to herein as "code") and "k8s.io/pod/name" (referred to herein as "pod") are indexed, then tags 1550, 1551 and 1552 are extracted from the front-end service 1539 while tags 1560, 1561 and 1562 are extracted from the product catalog service 1538.

In an implementation, the extracted indexed tags are mapped to tag attributes. The extracted tags 1550, 1551 and 1552 in the parent span (associated with the front-end service 1539) may be mapped to a "FROM" tag attribute while the extracted tags 1560, 1561 and 1562 in the child span may be mapped to a "TO" tag attribute. In one implementation, the mapped tags may be used to create node and edge data objects that are used to persist data for the metric events modality as shown in FIG. 15B.

Figure 15B:
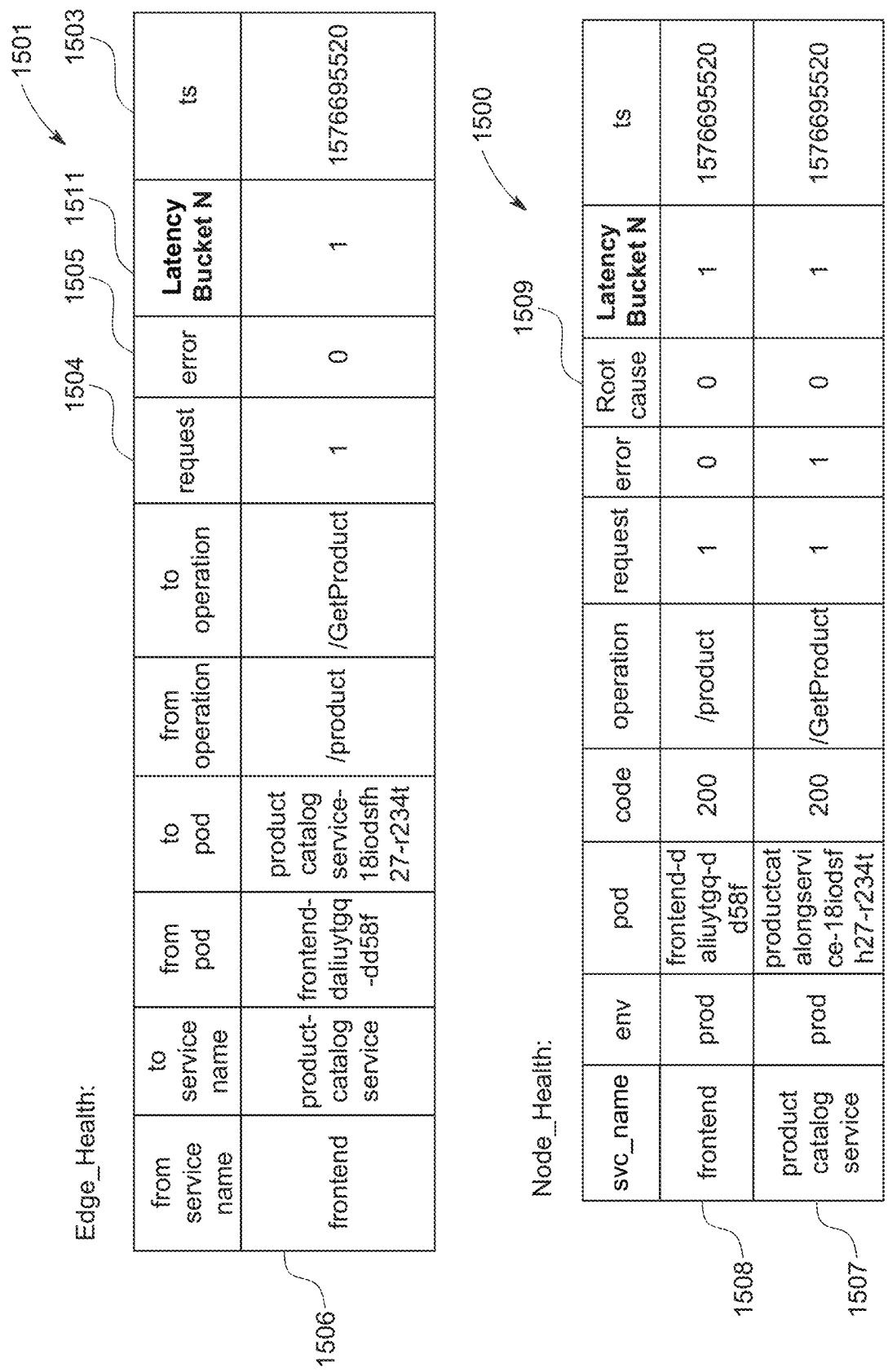
FIG. 15B illustrates the manner in which data in the metric events modality is persisted using an edge data object comprising a memory-resident table of tag attributes with associated counts and using a node data object comprising a memory-resident table of tags with associated counts, in accordance with an implementation of the monitoring service disclosed herein.

FIG. 15B illustrates the manner in which data in the metric events modality is persisted using an edge data object comprising a memory-resident table of tag attributes with associated counts and using a node data object comprising a memory-resident table of tags with associated counts, in accordance with an implementation of the monitoring service disclosed herein. In one implementation of the monitoring service disclosed herein, a memory-resident table 1501 titled "Edge Health" may be maintained to keep track of the various dependencies in the application. The table 1501 may be stored in, for example, in the storage module 1366 (in FIG. 13). A memory-resident table 1500 titled "Node Health" may be maintained to keep track of the various service nodes in the application. Both tables comprise aggregated rows comprising metrics values. In one implementation, these rows are stored efficiently for fast aggregation.

For example, the table 1501 may comprise one or more exemplary rows related to the cross-service span pair discussed in connection with FIG. 15A. Row 1506 is one exemplary row that may be generated for the cross-service span pair of FIG. 15A. Note that for simplicity, only tag attributes "from pod" and "to pod" are illustrated in row 1506 in FIG. 15B, but row 1506 would typically also comprise information for tag attributes associated with indexed tags "code" and "env" that are also indexed. As discussed above, each row for the cross-service span pair of FIG. 15A will comprise a unique set of "FROM" and "TO" tag attributes. For example, if the front-end service (e.g., front-end service 1539 in FIG. 15A) makes multiple calls to the product catalog service (e.g., product catalog service 1538 of FIG. 15A), but any of the calls are associated with different values for the "pod" tag from the values shown in row 1506, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1501 for the cross-service call discussed in connection with FIG. 15A, where each row would comprise a unique combination of "FROM" and "TO" tag attributes for a given cross-service span pair.

Each row in the table 1501 comprises a count value for number of requests 1504, errors 1505 and latency 1511. The requests 1504 are incremented each time the same cross-service call with the same unique set of attributes for a respective row is observed on a trace. The errors 1505 are incremented each time a request associated with a respective row is observed on a trace that has an error. The latency 1511 metric relates to a histogram of the duration that a respective request took. Further, each row comprises a timestamp 1503 to record the time of the cross-service call.

Using the metrics associated with the requests 1504, errors 1505 and latency 1511 and the timestamp 1503, aggregations on the rows may be performed quickly and efficiently to determine SLIs for varying ranges of time. In response to a client query then, the numeric rows in the tables 1500 and 1501 may be summed into either timeseries buckets or into a single number depending on the query.

In one implementation, the metric events modality may maintain a separate memory-resident table 1500 titled "Node Health" in system memory associated with the service nodes in the application. Each row in the memory-resident table 1501 comprises a unique combination of service names and associated tags. For example, row 1508 is associated with the front-end service (e.g., service 1539 in FIG. 15A) and comprises corresponding tag values for "env," "pod" and "code." Similarly, row 1507 is associated with the product catalog service (e.g., product catalog service 1538 of FIG. 15A) and comprises corresponding tag values for "env," "pod" and "code."

Each unique combination of service name and corresponding tag values is associated with metrics that are maintained in the memory-resident table 1500, e.g., request, error and latency (as discussed in connection with table 1501). These metrics may be used to perform fast and efficient aggregations. For example, if the client queried the number of times "env=prod" in the application, assuming the two exemplary services illustrated in table 1500 are the only ones where "env=prod," the request counts in each row would be aggregated to provide a result of 2.

Note that the memory-resident table 1500 may also comprise a "root cause" metric 1509 which tracks the number of times the corresponding service was the root cause of an error. For example, the "root cause" metric may be aggregated using the memory-resident table 1500 across multiple rows to determine the number of times each given service in an application was the root cause for an error.

In one implementation, a software tool may be employed to perform faster aggregations across the rows of tables 1500 and 1501. For example, Apache Druid, which is an open-source data store designed for sub-second queries on real-time and historical data, may be used to perform the aggregations rapidly and efficiently. In different implementations, other tools may also be used to perform aggregations. In one implementation, the information in the memory-resident tables 1500 and 1501 may be used in the metric events modality to perform the metrics aggregations for rendering the service graph (e.g., graph 900 of FIG. 9) and computing the associated SLIs.

In one implementation, the metrics event modality may also store Trace IDs associated for each unique combination of cross-service span pairs and corresponding indexed tags.

In one implementation, the aggregation module 1322 (of FIG. 13) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. Accordingly, exemplary Trace IDs may be maintained for each unique cross-service call.

The exemplary Trace IDs stored with each unique set of "FROM" and "TO" tag attributes for a cross-service span pair may be used by the querying module 1382 to respond to queries requesting more particularized information pertaining to non-indexed tags associated with the spans. For example, if a client needs particularized information regarding span performance or span duration, the querying module 1382 may be able to use the aggregated rows of information stored in a database associated with the storage module 1366 to access one or more exemplary Trace IDs associated with the call. Using the Trace IDs then, the querying module may be able to access the sessionized traces 1308 and perform analytics on the retrieved exemplary traces to deliver the requisite span performance and span duration information. In one implementation, the full trace information may be accessed from a storage set associated the full-fidelity modality, which stores the entire traces as ingested following sessionization. In a different implementation, however, the metric events modality may save full trace information for traces associated with the exemplary Trace IDs in a separate storage from the data set associated with the full-fidelity modality. In one implementation, because the metric events modality allows clients to retrieve raw trace data, it also allows clients to run an analysis on the retrieved data for an arbitrary set of tags (instead of being limited to the tags pre-indexed by indexing module 1307).

The metric events modality is particularly advantageous in circumstances where the client has identified a problem from the information provided by the metric time series. Having identified a problem either by manual monitoring of RED metrics or through an automatically generated alert, the client may be able to traverse deeper using the metric events data set and access relevant traces to receive more specific information regarding the problem. Also, the metric events mode allows the client to run an arbitrary analysis on the traces, e.g., on a set of tags that has not previously been indexed, which provides the client with specific information that may be used to diagnose and resolve the problem.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an implementation of the monitoring service disclosed herein. In one implementation of the monitoring service disclosed herein, a memory-resident table 1531 created to persist data is associated with the various dependencies in the application. Also, a memory-resident table 1530 created to persist data for the metric events modality is associated with the various service nodes in the application. Note that table 1531 is created in a similar way to table 1501 in FIG. 15B and that table 1530 is created in a similar way to table 1500 of FIG. 15B. Instead of tracking RED metrics, however, the tables in FIG. 15C comprise a column for Trace IDs 1590 and Exemplar Type 1591. It should be noted that, in one implementation, memory-resident table 1531 may be maintained in combination with memory-resident table 1501 and that memory-resident table 1530 may be maintained in combination with memory-resident table 1500.

Row 1597 in table 1531 is one exemplary row that may be generated for the cross-service span pair of FIG. 15C. Note that for simplicity, only tag attributes "from pod" and "to pod" are illustrated in row 1597 in FIG. 15C, but row 1597 would typically also comprise information for tag attributes associated with indexed tags "code" and "env." As discussed previously, each row for the cross-service span pair of FIG. 15A will comprise a unique set of "FROM" and "TO" tag attributes. Accordingly, there may be multiple rows in table 1531 for the cross-service call discussed in connection with FIG. 15A, where each row would comprise a unique combination of "FROM" and "TO" tag attributes for a given cross-service span pair. Each row in table 1531 comprises a column for Trace IDs 1590, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one implementation, the Exemplar Type column 1591 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one implementation, the monitoring system may maintain a separate table 1530 associated with the service nodes in the application. Rows 1595 and 1596 in table 1530 are two exemplary rows that may be generated for the cross-service span pair of FIG. 15A. Each row in table 1530 comprises a unique combination of service and associated tags. For example, row 1595 is associated with the front-end service (e.g., service 1539 in FIG. 15A) and comprises corresponding tag values for "env," "pod" and "code." Similarly, row 1596 is associated with the product catalog service (e.g., product catalog service 1538 of FIG. 15A) and comprises corresponding tag values for "env," "pod" and "code."

Each unique combination of service name and corresponding tag values is associated with a Trace ID and Exemplar type that is maintained in table 1530.

As noted above, in one implementation, metrics event data may be persisted in tables that consolidate the data shown in FIG. 15B and FIG. 15C. For example, table 1501 may comprise an additional column to track Trace IDs and similarly table 1500 may comprise an additional column to track Trace IDs.

The Trace IDs may be used in metrics events modality to retrieve full traces for more detailed analysis. In one implementation, full traces associated with the exemplary Trace IDs may be maintained in a dedicated storage associated with the metric events. In a different implementation, the full traces may be accessed from a data set associated with the full-fidelity mode.

It should be noted that the metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows clients to configure alerts against one of more time series to monitor incoming data in real-time. Because metric events are generated from postsessionized traces, the metrics data associated with metric events may not be computed as rapidly as compared with the metric time series modality

4.3 Full-Fidelity Modality

In one implementation, the full-fidelity module 524 of FIG. 5 stores all the incoming trace data from the sessionization process in real time. Unlike the prior two modes, the full-fidelity modality stores the trace data in its raw form. In one implementation, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one implementation, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 16:
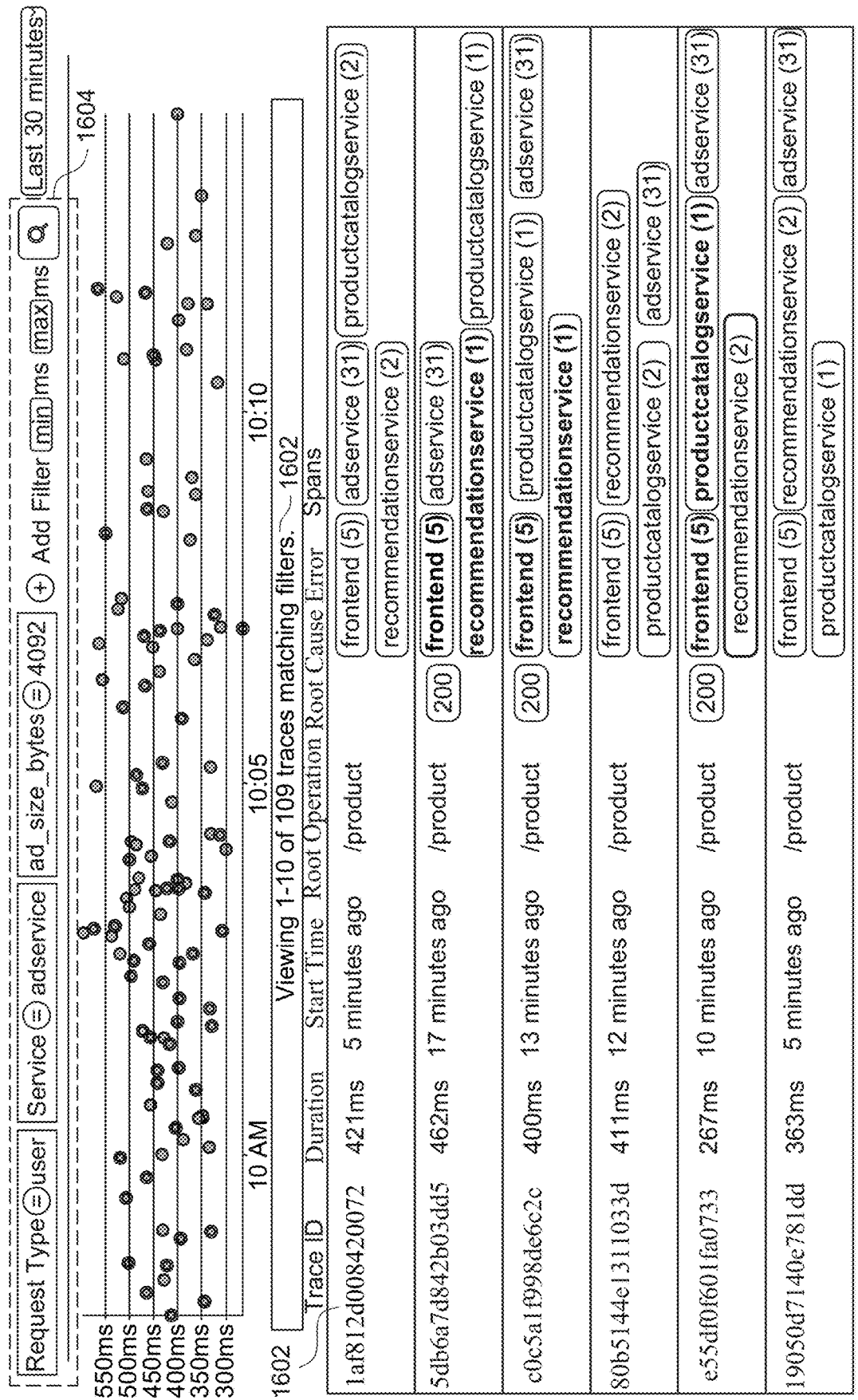
FIG. 16 is an on-screen GUI showing the manner in which a client may submit a query to be executed against the full set of traces stored in connection with the full-fidelity modality, in accordance with implementations of the monitoring service disclosed herein.

FIG. 16 is an exemplary on-screen GUI showing the manner in which a client may submit a query to be executed against the full set of traces stored in connection with the full-fidelity modality, in accordance with implementations of the monitoring service disclosed herein. The full-fidelity modality, in one implementation, allows a client to execute a query against arbitrary tags to receive a set of traces that matches the query. For example, in the GUI of FIG. 16, the client enters a query 1604 for traces where "Request Type=user," "Service=adservice" and the tag "ad_size_bytes=4092." In response, the platform returns a list 1602 of the traces matching the client-entered filters and, further, provides information about the traces, e.g., the Trace ID, duration, start time, root operation, root cause error status code and associated spans. As mentioned previously, the traces retrieved in response to a query may be analyzed to determine performance summaries for the spans comprised therein. Alternatively, the span performance analysis can be computed on all the traces stored as part of the full-fidelity data set. In one implementation, the monitoring platform has the ability to run a full trace search (as shown in FIG. 16), and feed the traces collected into other modalities of analysis to get more detailed information about an arbitrary set of traces and an arbitrary set of attributes associated with the set of traces.

5.0 Using Workflows to Monitor Client Processes or User-Interactions

There are several challenges associated with implementing an observability platform (e.g., monitoring service 306 of FIG. 3) that can perform application performance monitoring (APM) within a heterogeneous distributed system. One of the challenges is associated with providing clients meaningful information regarding where work is occurring related to a particular user-interaction, a given activity or transaction, or a client process and, also, regarding application-specific use cases that cannot be easily captured with basic instrumentation techniques.

Workflows may be used in APM in order to monitor the interactions between services in a microservices architecture that are related to a particular user-interaction, activity, transaction or to a particular client process. Workflows group together any activity within a trace that relate to the particular user-interaction, activity, transaction or client process. A workflow may provide information regarding the start-to-finish path of one or more traces associated with the given user-interaction, activity, transaction or client process. The path for a workflow comprises the various services and cross-service dependencies in a trace that are invoked by the given user-interaction or client process.

Workflows may be used by a client (e.g., a software engineer or a site reliability engineer) to monitor and troubleshoot end-to-end transactions in the client's system. In the retail context, an end-to-end transaction might encompass initial contact through order fulfillment, as captured by a trace. Another example of a client process may be a checkout process on a website of an online retailer. Conventional tracing and monitoring tools do not provide clients the ability to effectively isolate and monitor a group of services in a microservices architecture that is associated with a particular client transaction without needing to manually instrument one or more microservices in the architecture with workflow names specific to the client's architecture.

Implementations of the monitoring platform disclosed herein (e.g., monitoring service 306) allow clients to monitor a path or sequence of events that occurs in a distributed application in response a particular user-interaction or a client process by assigning a "workflow" dimension and corresponding value to a trace. For example, a client may need to monitor a chain of calls and associated services that are invoked in response to a user electing to conduct a checkout transaction on a website for an online retailer. In one implementation, the value of the workflow dimension assigned to the trace may depend on the type of work (e.g., a user-interaction, activity, transaction or client process) associated with or performed by the trace. For example, the workflow name assigned to a checkout transaction may be "cartservice:checkout."

Further, implementations of the monitoring platform allow clients to configure rules and procedures that are executed to automatically attribute a workflow dimension and associated value to one or more traces generated by the microservices architecture. Automatically attributing a workflow dimension (and associated value) to traces generated by the architecture is significantly more efficient compared to conventional tracing and monitoring tools which require the client to manually instrument the software to include a workflow dimension and associated value in the tags of emitted spans.

Implementations of the monitoring platform disclosed herein (e.g., monitoring service 306) also allow clients to track the root cause of a failure within a workflow (that is associated with a trace). The failure may, for example, have resulted in an error or possibly a degraded response being returned to a client in response to a request. Because the error may be observed at the front end of the distributed application (or at a location different from where the error actually originated), the client may not have any insight into which service within the workflow caused the error. Based on certain predetermined heuristics, implementations of the monitoring platform disclosed herein attribute the root cause of a failure within a workflow to a particular service, which provides clients with a starting point to investigate where errors within a workflow originate.

5.1 Rule-Based Configuration of Workflows

In order to monitor particular user-interactions, transactions, activities or client processes, conventional tracing and monitoring tools require that the software be manually instrumented by a client to emit workflow related tags (and corresponding values) specific to the client within the spans. Based on metadata extracted from the instrumented workflow tags in one or more spans or traces ingested into the monitoring platform, conventional monitoring tools are able to compute metrics to provide further insight regarding the performance of the workflow itself or the services comprised within the workflow.

Implementations of the monitoring platform disclosed herein advantageously allow workflows to be configured more efficiently by allowing clients to compose rules that are executed to automatically determine workflow values (or names) and, further to, automatically assign the workflow values to one or more traces aggregated by the monitoring platform. In this way implementations of the monitoring platform provide more granular control over the configuration of workflows as compared to conventional monitoring tools. Referring to FIG. 5, the rules may be executed, for example, after the traces 508 have been sessionized by the sessionization module 506. In one implementation the rules to determine and assign the workflow values may be executed by the tag indexing module 507.

As noted previously, a "workflow" is a category of dimension of a request that was processed and may be conceptualized as a type of "global tag" that is attributed to a particular trace. Implementations of the monitoring platform enable a client to configure rules that automatically determine the names (or values) corresponding to the workflow dimension and to attribute the workflow dimension (and corresponding name) directly to a trace. Each trace sessionized by the monitoring platform may comprise a global workflow tag, the value for which is computed by executing the rules configured by the client. In one implementation, the workflow dimension (and corresponding value) may also be included within the set of tags attributed to each span in the particular trace. A workflow may, for example, be associated with a type of client process, e.g., "checkout," "update cart," "add to cart," etc. that originates in response to a user request.

Attributing the workflow dimension to traces allows the monitoring platform to create logical groupings of services involved in a particular client process. The workflow dimension therefore allows ingested traces to be grouped based on the respective value of the workflow dimension and allows for metrics to be calculated for each type of workflow (e.g., each value associated with the workflow dimension).

Typically, each trace is associated with a single workflow. As noted previously, a trace generally refers to a record of the manner in which a single user request, also referred to as a transaction, propagates from one service to the next in a distributed application. The spans resulting from one user request may be consolidated into a trace in the backend of the monitoring platform where the trace correlates with a single workflow.

In one implementation, clients are provided with a graphical user interface (GUI) to configure the rules that automatically determine the manner in which workflow names (or values) are assigned to the one or more sessionized traces aggregated by the monitoring platform. Configuring workflows based on rules is a significant improvement over conventional monitoring tools that require manual instrumentation of the software as discussed previously.

Figure 17:
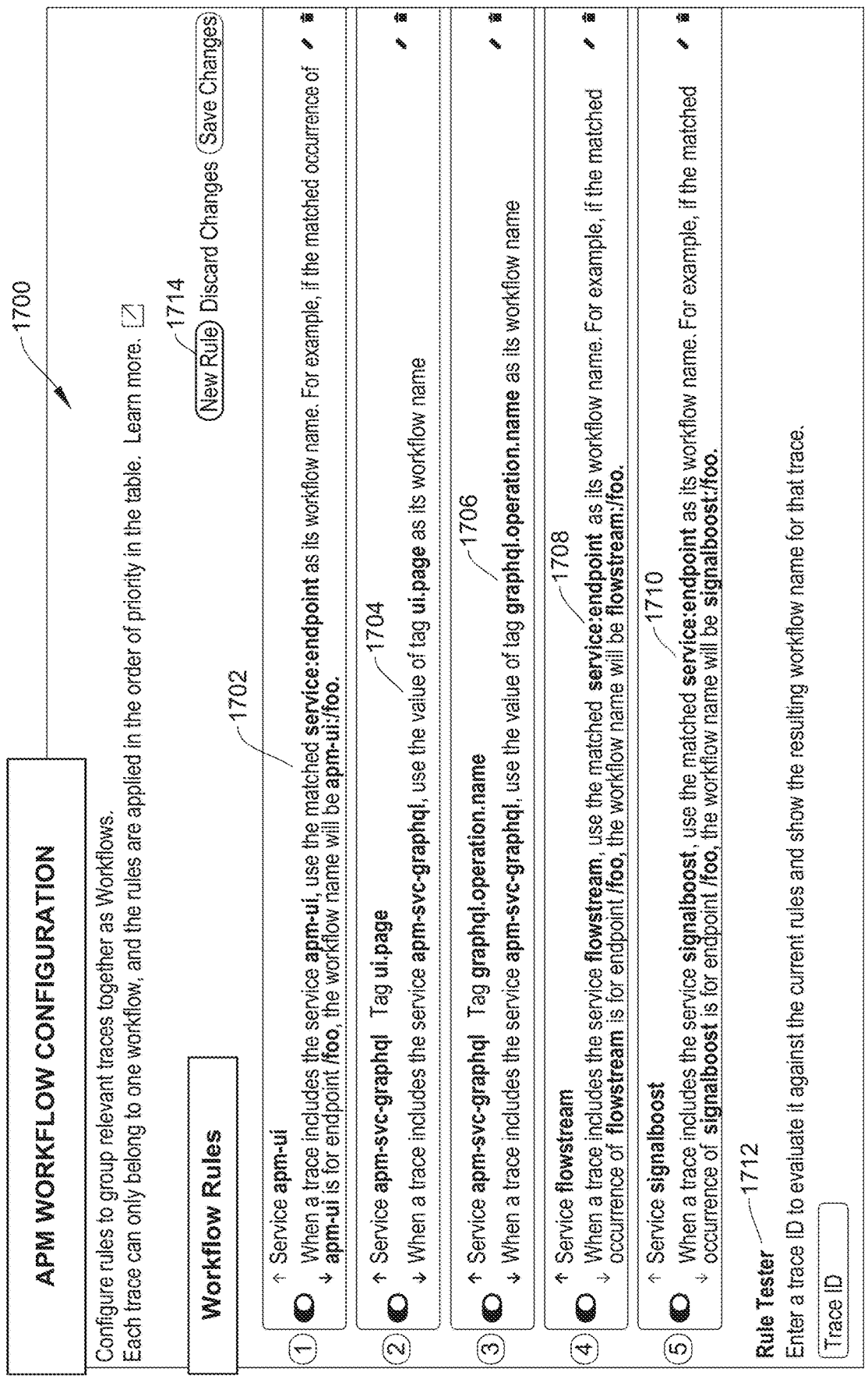
FIG. 17 illustrates an exemplary on-screen GUI for configuring workflows, in accordance with implementations of the monitoring service disclosed herein.

FIG. 17 illustrates an exemplary on-screen GUI for configuring workflows, in accordance with implementations of the monitoring service disclosed herein. GUI 1700 allows clients to configure rules for determining the manner in which workflow names are assigned to the one or more sessionized traces. The rules may relate, for example, to naming a workflow based on a particular tag within a trace or within a particular service of the trace. Note that the rules are not limited in any fashion and may be configured in a variety of ways to suit a client's needs.

In one implementation, the rules (e.g., rules 1702, 1704, 1706, 1708 and 1710) are executed in order of priority. For example, rule 1702 will carry a higher priority than rule 1704, which will carry a higher priority than rule 1706, and so forth. Accordingly, if a lower priority rule conflicts with a higher priority rule, the workflow name will be assigned in accordance with the higher priority rule. For example, rule 1704 states that if a trace includes the service "apm-svc-graphql," the value of tag "ui.page" is assigned as the workflow name to the trace. Rule 1706, meanwhile, states that if a trace includes the service "apm-svc-graphql," the value of tag "graphql.operation.name" is assigned as the workflow name to the trace. If the monitoring platform locates a trace which includes the service "apm-svc-graphql," the conflict between rules 1704 and 1706 will be decided in favor of rule 1704 because it has a higher priority as compared to rule 1706.

Note that the rules 1702-1710 do not necessarily need to be developed and entered manually by a client. In one or more implementations, the monitoring system may be pre-programmed with a default set of rules. Alternatively, in one or more implementations the rules 1702-1710 may be machine generated using traditional machine learning or natural language processing techniques. In one implementation, the monitoring system may be able to prioritize between the competing rules to determine which rules should be given precedence over others rather than relying on any client feedback regarding the priority.

In one implementation, a client can reconfigure the rules through the GUI 1700 by adding, deleting or modifying a rule. For example, a "New Rule" button 1714 may be accessed by a client to create an additional rule. Thereafter, the client may drag the newly created rule to an appropriate position within the hierarchy of priority. For example, if the newly created rule carries a higher priority than rule 1706, it would be dragged and placed by the client between rules 1704 and 1706.

The GUI 1700 may also provide clients with a "Rule Tester" option 1712. The Rule Tester option 1712 allows client to evaluate a submitted Trace ID against the currently configured rules to determine a resulting workflow name for the trace. In this way, a client can test the rules to determine if the appropriate workflow name would be assigned to a given trace.

5.2 Computing Monitoring and Trouble-Shooting Metrics for Workflows

Figure 18A:
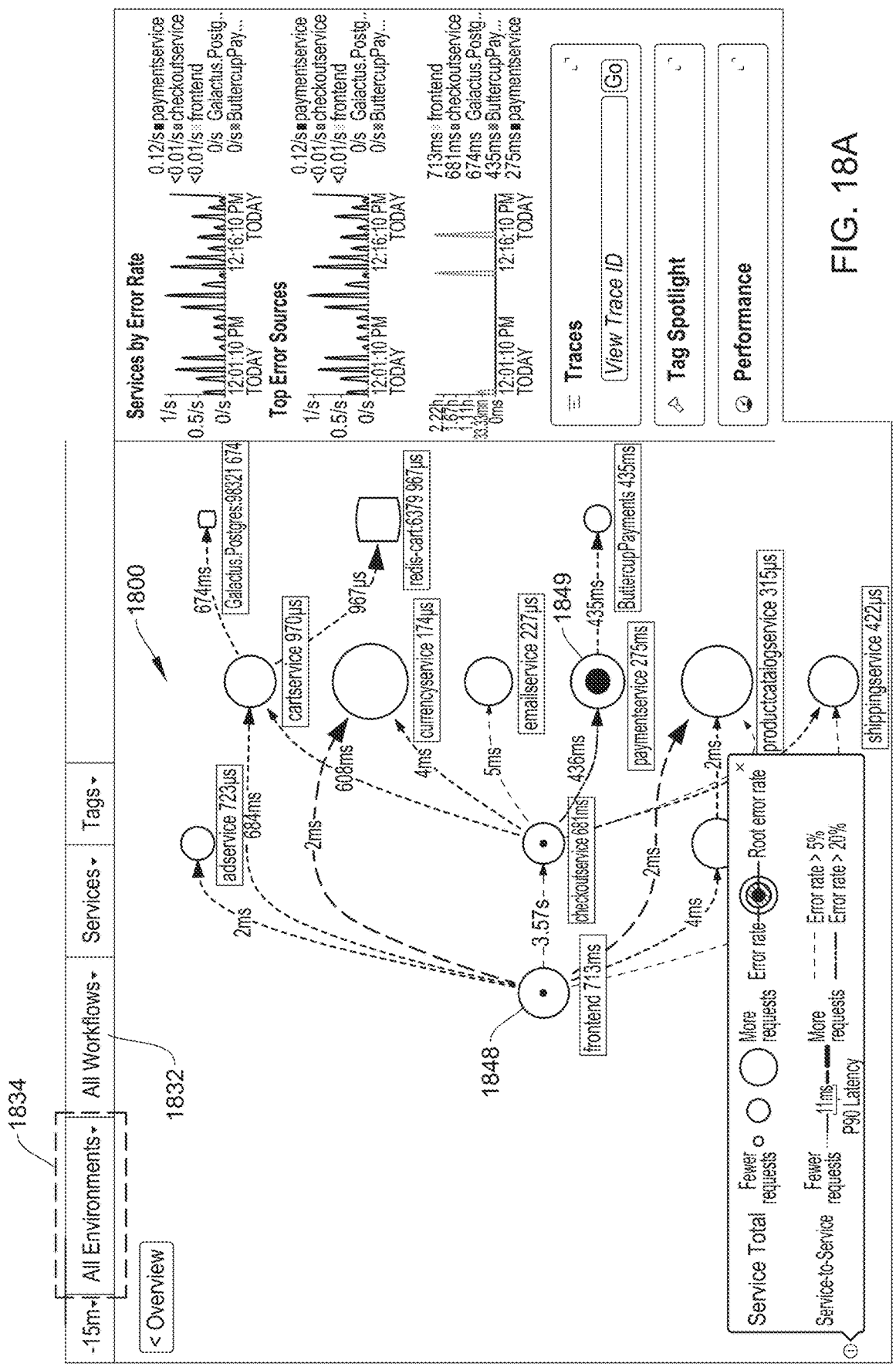
FIGS. 18A and 18B illustrate an exemplary on-screen GUI indicating the manner in which a client may filter a service graph by the workflow dimension to display real-time metrics specific to the selected workflow, in accordance with implementations of the monitoring service disclosed herein.
Figure 18B:
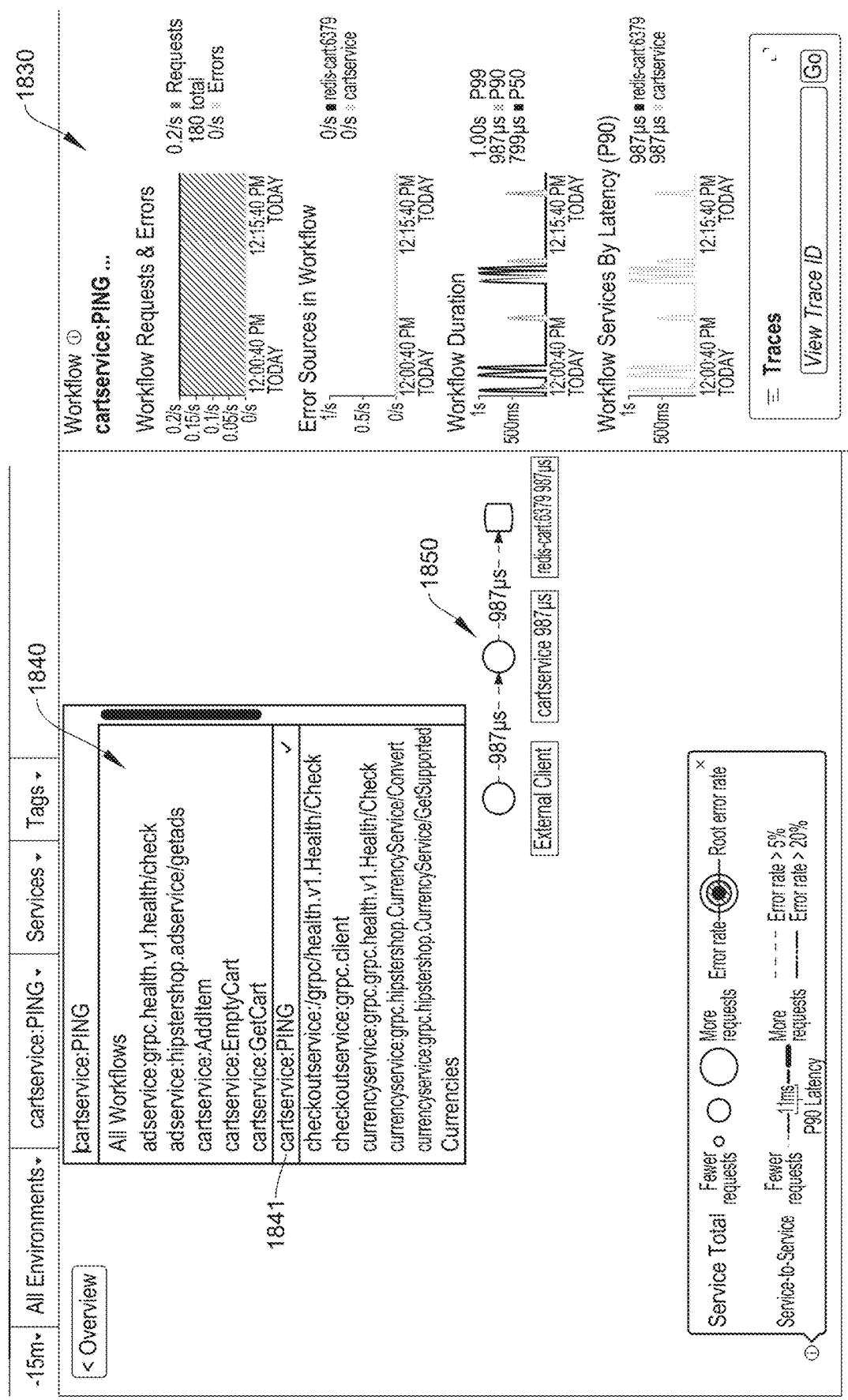

Automatically assigning a workflow name to traces associated with a particular user-interaction or a client process advantageously allows implementations of the monitoring service disclosed herein to track metrics associated with the respective user-interaction or process more efficiently. FIGS. 18A and 18B illustrate an exemplary on-screen GUI indicating the manner in which a client may filter a service graph by the workflow dimension to display real-time metrics specific to the selected workflow, in accordance with implementations of the monitoring service disclosed herein. As shown in FIG. 18A, the GUI may display a workflow dimension 1832 in addition to other categories of dimensions (e.g. environment) 1834 that may be varied across the service graph 1800.

Implementations of the monitoring service disclosed herein are also able to construct a topology graph that facilitates visualizing cross-service relationships between services associated with the workflow. For example, a workflow may be selected from menu 1840 shown in FIG.

18B in order to display services and dependencies associated with the selected workflow "cartservice:PING" 1841. As shown in FIG. 18B, the service graph 1800 may be filtered to display the service graph 1850 of FIG. 18B, which selectively displays the services and dependencies associated with the workflow "cartservice:PING" 1841. Note that the workflow dimension 1832 shown in FIG. 18A may be varied to display real-time metrics including error-related information for each of the various workflows.

In one implementation, the GUI may include a side-panel 1830 that may display troubleshooting metrics associated with the selected workflow "cartservice:PING" 1841 as shown in FIG. 18B. For example, the side-panel 1830 may display Request, Error, Latency (RED metrics) related metrics for the selected workflow. The troubleshooting metrics shown in the side-panel 1830 may be determined using the metric events modality.

Figure 18C:
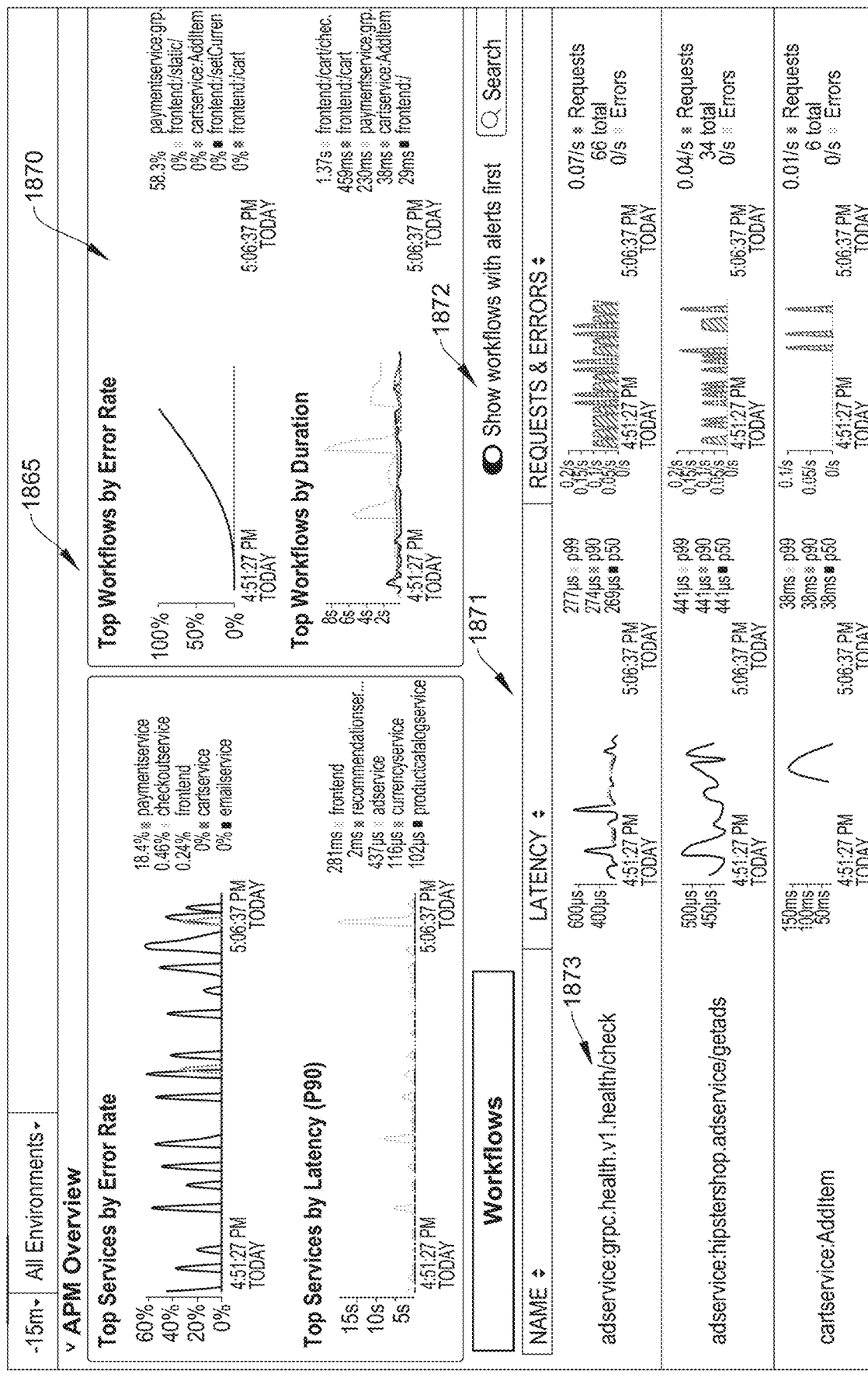
FIG. 18C illustrate an exemplary on-screen GUI indicating the manner in which monitoring metrics may be displayed for workflows associated with a client's application, in accordance with implementations of the monitoring service disclosed herein.

FIG. 18C illustrate an exemplary on-screen GUI indicating the manner in which troubleshooting metrics may be displayed for workflows associated with a client's application, in accordance with implementations of the monitoring service disclosed herein. As noted above, once workflows within a client's application have been identified and the traces have been tagged with the workflow names, troubleshooting metric sets associated with the workflows may be computed. Using the troubleshooting metric sets computed for the workflows, panel 1870 in GUI 1865 is able to display the top workflows by error rate and top workflows by duration.

Further, panel 1871 displays RED metrics for each of the workflows in the application. Note that the RED metrics are computed based on the duration of the trace that was identified as part of the workflow.

In one implementation, the metric time series modality can also be configured to deliver real-time alerts to a client in connection with the RED metrics, e.g., anomalies related to the request rate, error rate, or latency (duration). Note, that using the monitoring metric sets, detectors (e.g., sudden change detectors, historical anomaly detectors, etc.) may be configured that alert the client to anomalous activity associated with a particular workflow. In one implementation, an alert option 1872 is provided that allows client to primarily show workflows in the panel 1871 that have anomalous activity reported in connection with them. For example, a client may configure a detector using the monitoring metric sets that alerts a client if the number of requests exceed 0.01/second. Accordingly, if anomalous behavior is detected in connection with a particular workflow, e.g., "adservice:grpc.health.v1.health/check" 1873 because the number of requests exceeded 0.01/second, the workflow 1873 would be given precedence for display in the panel 1871.

Figure 19:
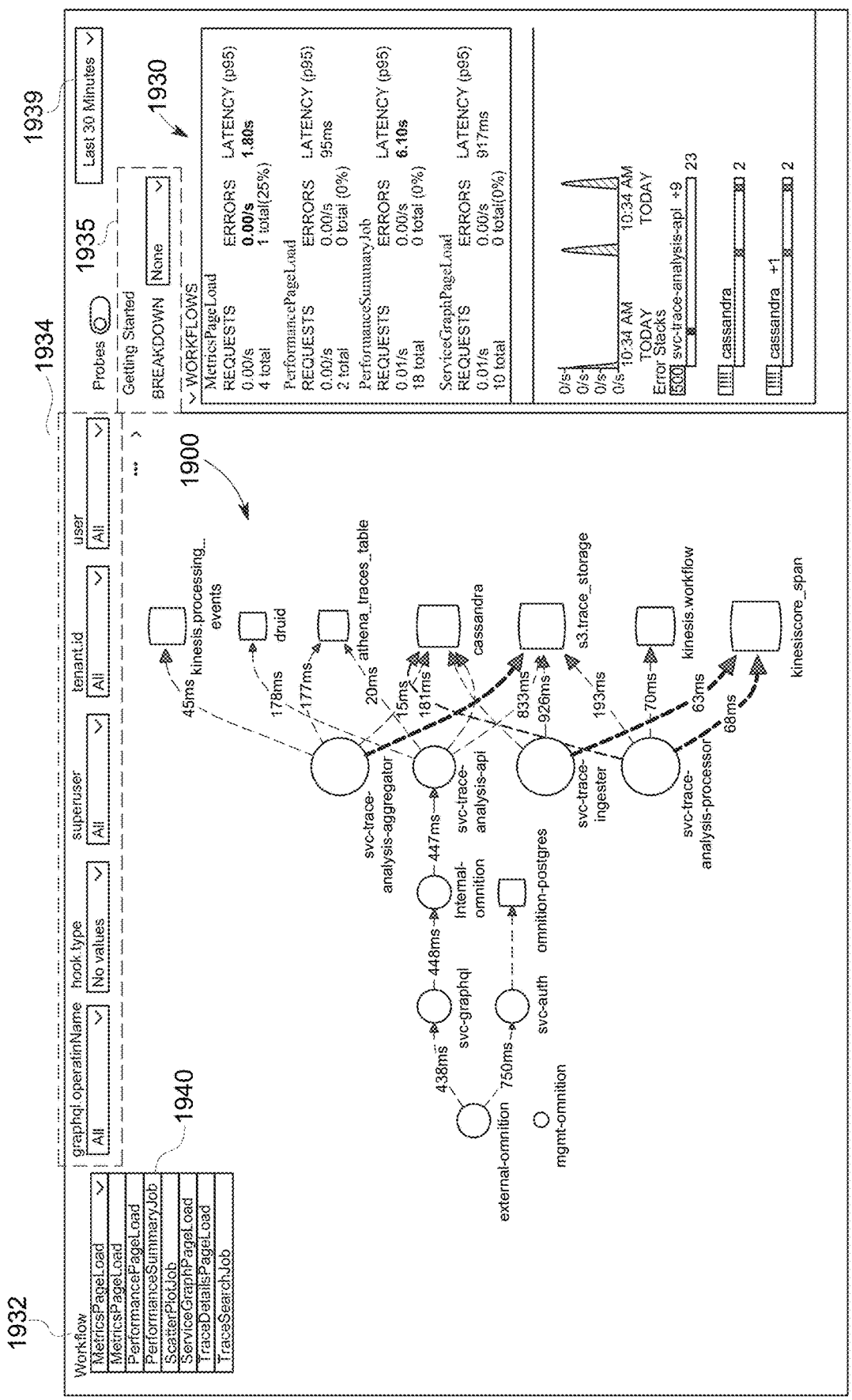
FIG. 19 illustrates an exemplary on-screen GUI showing the manner in which a client may filter a service graph for an application by the workflow dimension, in accordance with implementations of the monitoring service disclosed herein.

FIG. 19 illustrates an exemplary on-screen GUI showing the manner in which a client may filter a service graph for an application by the workflow dimension, in accordance with implementations of the monitoring service disclosed herein. As shown in FIG. 19, the GUI may display a workflow dimension 1932 in addition to other categories of dimensions 1934 that may be varied across the service graph 1900. By extracting information related to additional tags, higher cardinality metrics may be computed using the metric time series modality. As noted previously, the metric events modality may provide a client resolution into a larger set of indexed tags. Because the high-cardinality metrics dataset (also known as trouble-shooting metrics associated with the metric events modality) is used, a client is able to easily and rapidly query measurements across various cross-combinations of attributes (including the workflow dimension 1932 and the other categories of dimensions 1934). Further, a client is able to configure alerts on the custom dimensions as well, where the alerts inform a client if a particular dimension has crossed some critical threshold.

Each of the categories of dimensions 1934 provide dimensions across which SLIs may be queried. Each of the drop down on-screen menus associated with the categories of dimensions 1934 can be selected to display the various dimensions across which aggregations may be made. For example, the user may submit a query asking for the number of requests in a trace where "Workflow=frontend:/cart" and "incident=instance_errors" and "tenant-level=gold." By aggregating metrics data associated with the indexed tags, the metric events modality is able to respond to the user's query rapidly and efficiently.

In one implementation, a workflow may be selected from menu 1940 in order to display services and dependencies associated with a selected workflow. The workflow dimension 1932 and other dimensions 1934 may be varied to query high-cardinality metrics, SLIs and error-related information for different combinations of the attributes over a selected time duration 1939 using data from the metric events modality.

Further, as shown in FIG. 19, the GUI may include a side-panel 1930 that may display metrics across the various workflows (or any other selected dimension) for the selected time duration 1939 using the high-cardinality metrics data set. For example, side-panel 1930 may display Request, Error, Latency (RED metrics) related metrics for each of the workflows aggregated over the selected time duration 1939. Further, the GUI allows clients the ability to break down the workflows across multiple different attributes using drop down menu 1935. The computations for each of the breakdowns may also be efficiently determined using the metrics data aggregated for the metric events modality.

Figure 20:
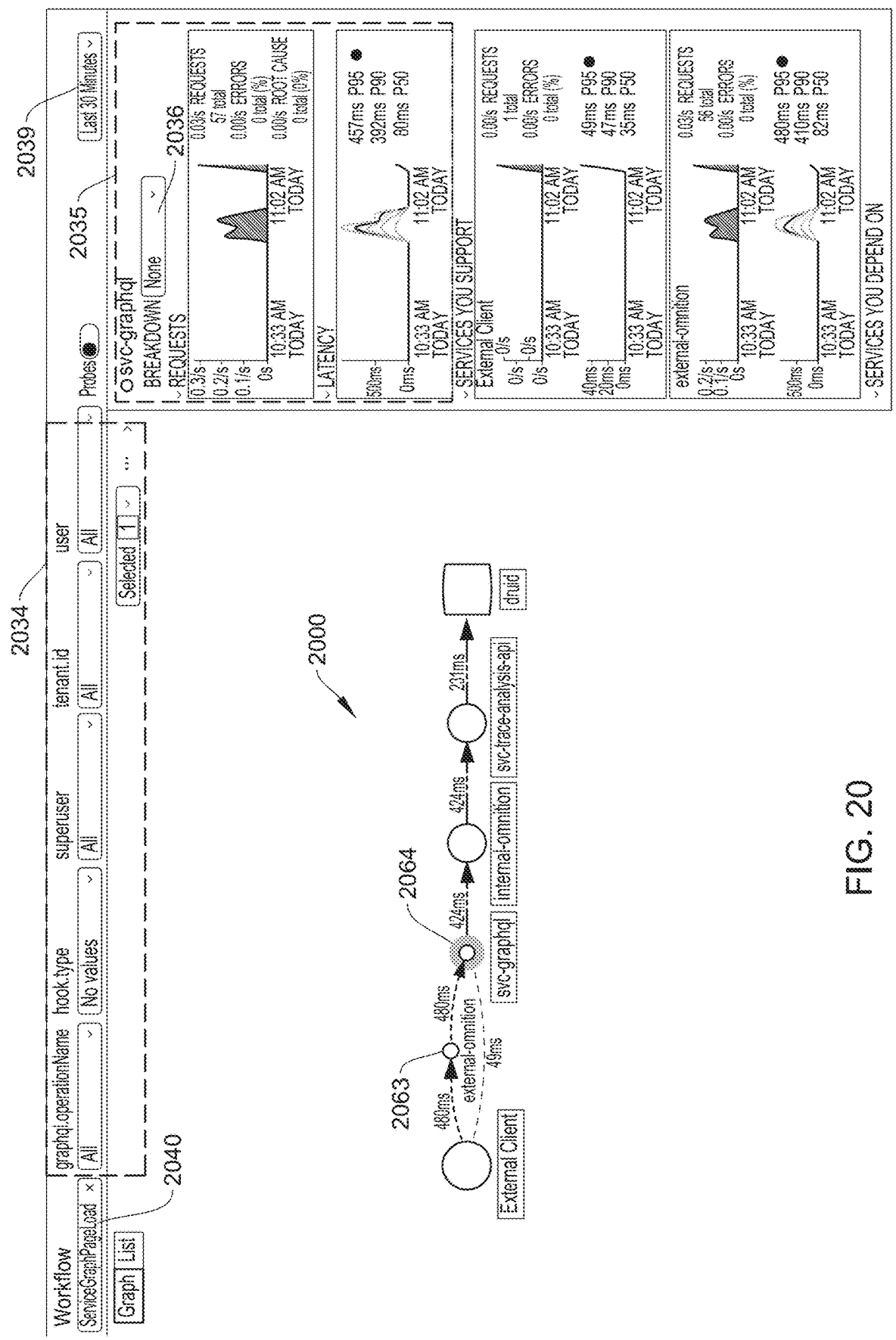
FIG. 20 illustrates an exemplary on-screen GUI showing the manner in which a path associated with a given workflow may be displayed, in accordance with implementations of the monitoring service disclosed herein.

FIG. 20 illustrates an exemplary on-screen GUI showing the manner in which a path associated with a given workflow may be displayed, in accordance with implementations of the monitoring service disclosed herein. As shown in FIG. 20, when workflow ServiceGraphPageLoad 2040 is selected, the complete service graph 1900 (as shown in FIG. 19) is filtered down to display a portion 2000 of the topology graph, where the portion 2000 of the topology graph that is represented on-screen comprises the services and dependencies associated with the ServiceGraphPageLoad workflow. In other words, information regarding the services and the cross-service dependencies associated with the ServiceGraphPageLoad workflow is extracted from traces tagged with the "ServiceGraphPageLoad" workflow. These services and dependencies are then represented visually as shown in FIG. 20 where they depict a path associated with the ServiceGraphPageLoad workflow. Note that FIG. 20 presents an aggregated view which displays the relationship between the services that participated in the "ServiceGraphPageLoad" workflow.

In an implementation, high-cardinality metrics (also known as trouble-shooting metrics) associated with the ServiceGraphPageLoad workflow can further be broken down and computed across a range of different dimensions 2034 and aggregated over a selected time window 2039. Further, in one implementation, any of the services (e.g., svc_graphql) in the portion 2000 of the service graph associated with the ServiceGraphPageLoad workflow can be selected, as shown in FIG. 20, to display metrics associated with the selected service svc_graphql (over the selected time window 2039) in a side-panel 2035. These metrics may be further filtered with respect to other dimensions by selecting one of the dimensions using menu 2036 and aggregated over the time window 2039.

Figure 21:
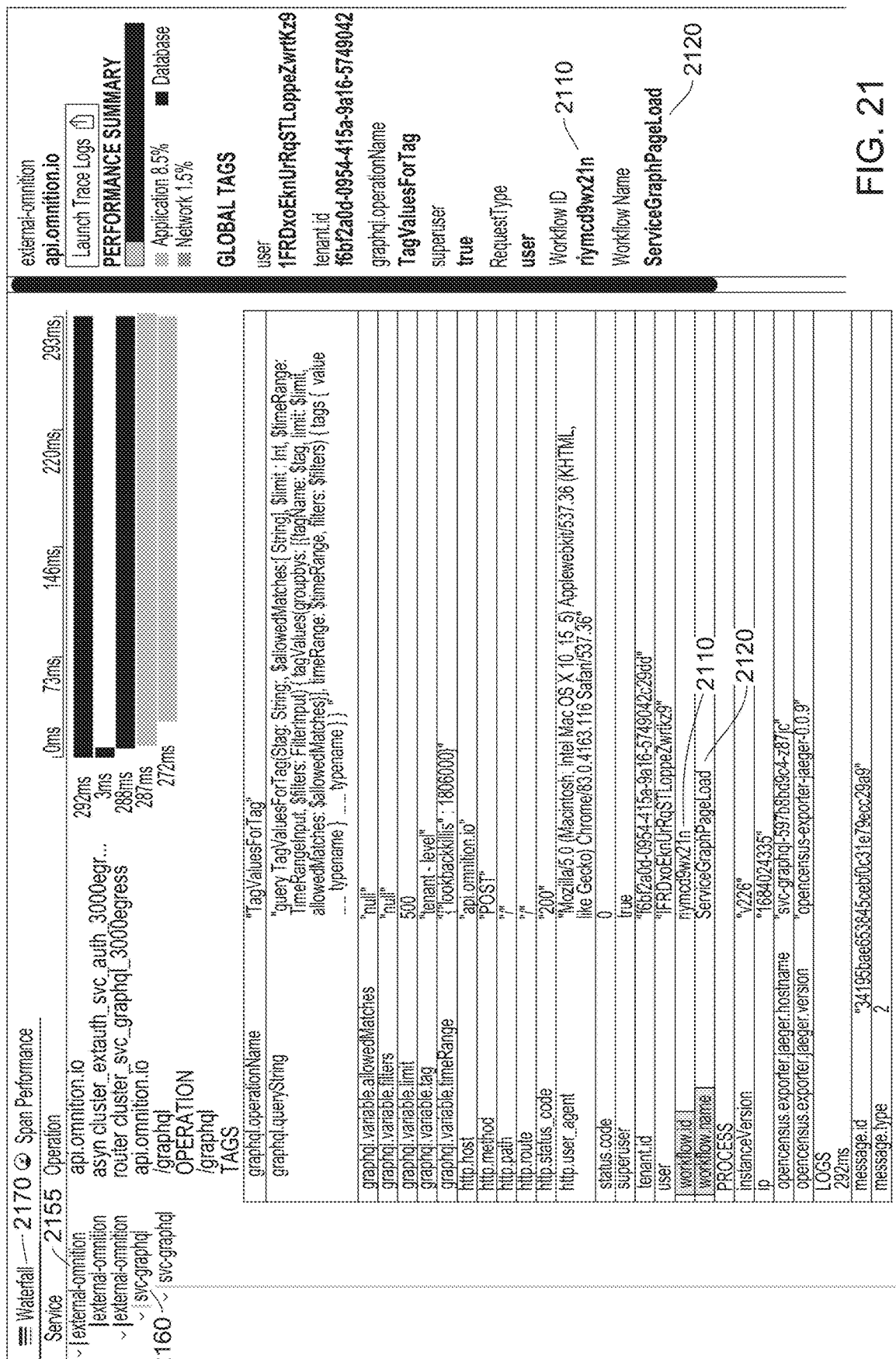
FIG. 21 illustrates an exemplary on-screen GUI showing a visual representation of an exemplary trace associated with the workflow selected in FIG. 20, in accordance with implementations of the monitoring service disclosed herein.

FIG. 21 illustrates an exemplary on-screen GUI showing a visual representation of an exemplar trace associated with the workflow selected in FIG. 20, in accordance with implementations of the monitoring service disclosed herein. FIG. 21 presents a waterfall view 2170 of a trace. The GUI of FIG. 21 displays a trace associated with the ServiceGraphPageLoad workflow. As shown in FIG. 21, the trace associated with the ServiceGraphPageLoad workflow comprises the external-omnition service 2155 (which corresponds to the external-omnition service 2063 as represented in FIG. 20) making a call to svc-graphql service 2160 (which corresponds to the svc-graphql service 2064 as represented in FIG. 20). As shown in FIG. 21, the trace is attributed a global tag for the workflow 2120 comprising a value of "ServiceGraphPageLoad." The workflow 2120 may be associated with a workflow identifier 2110 with a value of "riymcd9wx21n."

Figure 22:
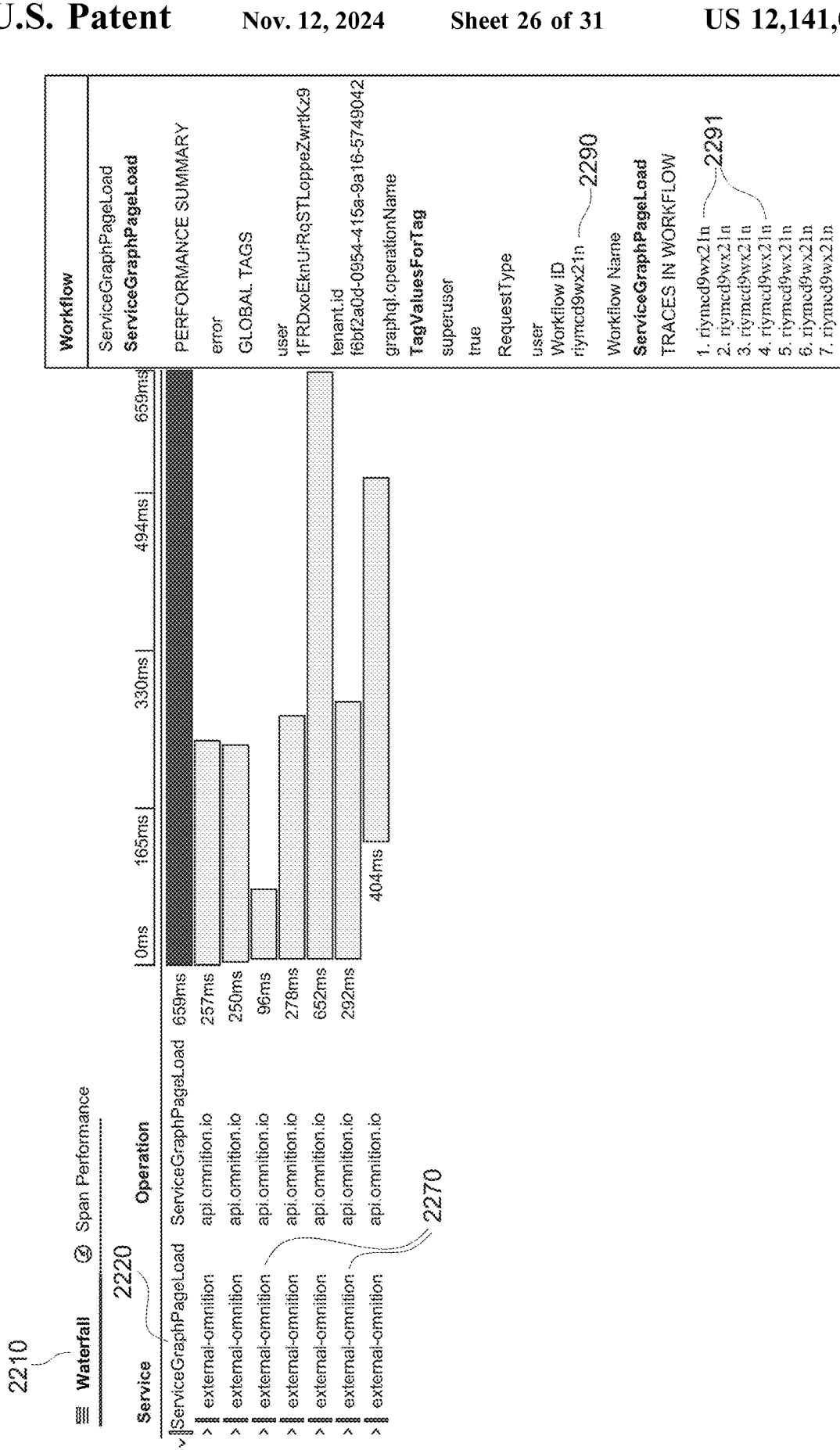
FIG. 22 illustrates another exemplary on-screen GUI showing a waterfall representation of an exemplar trace associated with a workflow, in accordance with implementations of the monitoring service disclosed herein.

FIG. 22 illustrates another exemplary on-screen GUI showing a waterfall representation of an exemplar trace associated with a workflow, in accordance with implementations of the monitoring service disclosed herein. As shown in FIG. 22, a waterfall view 2210 associated with a ServiceGraphPageLoad workflow 2220 (corresponding to ServiceGraphPageLoad workflow 2040 selected in FIG. 20) may be selected, wherein the waterfall view 2210 displays all the spans within a trace associated with the ServiceGraphPageLoad workflow 2220. The spans 2270 are associated with the trace corresponding to the ServiceGraphPageLoad workflow 2220. As mentioned above, the workflow may be associated with a workflow identifier 2290. Further, hyperlinks 2291 to other traces with the same workflow dimension may be provided within with the GUI. The workflow name (or workflow identifier) attribute allows traces with the same workflow to be logically grouped together.

Figure 23:
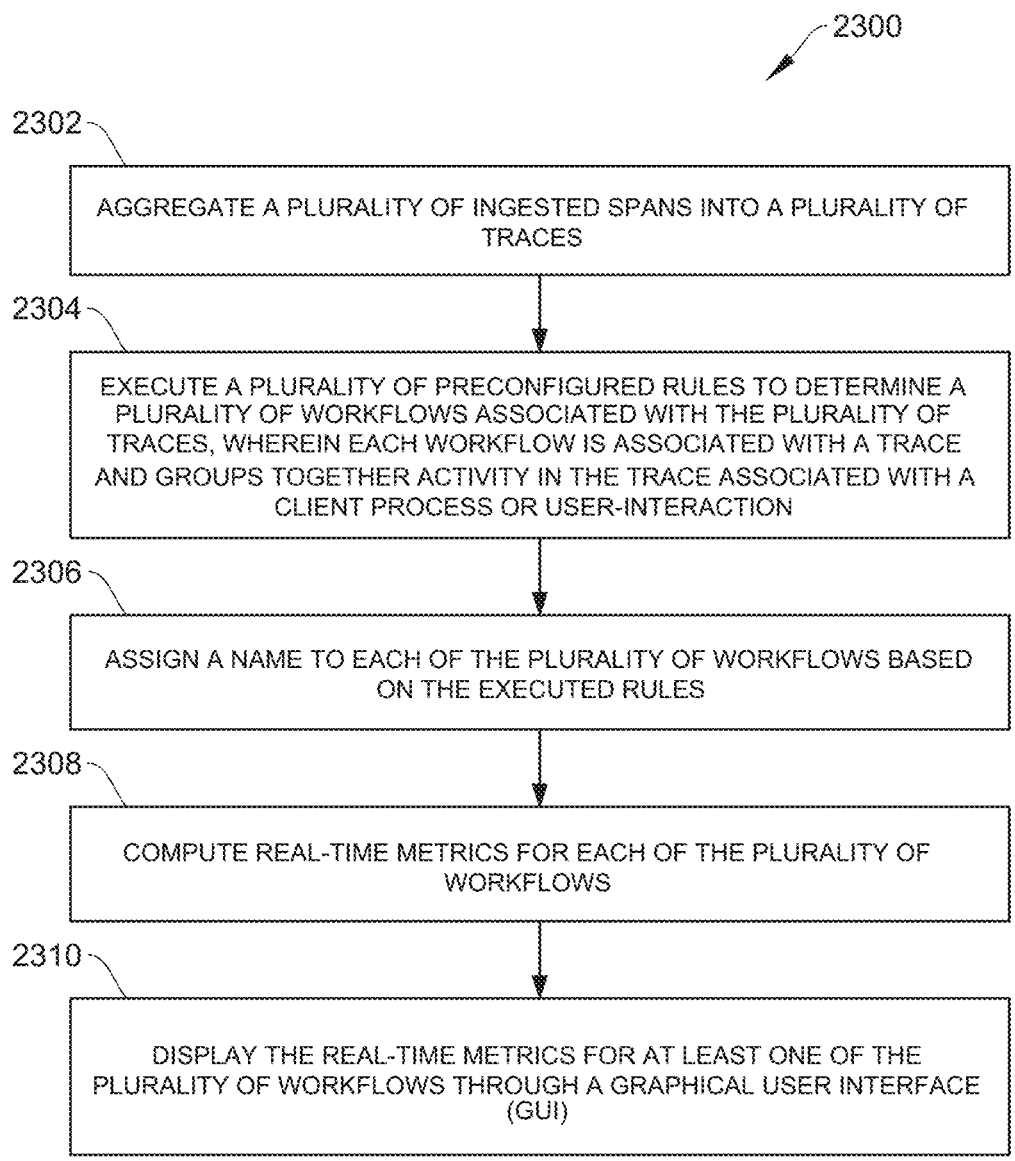
FIG. 23 presents a flowchart illustrating a computer implemented process for computing real-time metrics for automated workflows, in accordance with implementations of the monitoring service disclosed herein.

FIG. 23 presents a flowchart illustrating a computer implemented process for computing real-time metrics for automated workflows, in accordance with implementations of the monitoring service disclosed herein. Blocks 2302-2308 describe exemplary steps comprising the process 2300 depicted in FIG. 23, in accordance with the various implementations herein described. In one implementation, the process 2300 is implemented at least in part as computer-executable instructions stored in a computer-readable medium and executed in one or more processing devices.

At block 2302, a plurality of spans associated with a microservices-based application are automatically ingested and sessionized into a plurality of traces. The monitoring platform is able to ingest all the incoming spans without sampling.

At block 2304, a plurality of pre-configured rules are executed by the monitoring platform to configure a plurality of automated workflows, wherein each workflow of the plurality of workflows is associated with a trace from the plurality of traces, and wherein each workflow groups together activity in a respective trace associated with a user-interaction or client process.

At block 2306, based on the executed rules, a name is assigned to each of the plurality of workflows.

At block 2308, real-time or monitoring metrics are computed for each of the plurality of workflows.

At block 2310, the real-time metrics are displayed for one or more of the plurality of workflows through a graphical user interface.

5.3 Identifying the Root Cause of a Failure in a Workflow

One of the challenges associated with microservice architectures is obtaining visibility in distributed workflows without a central orchestrator. Errors or performance degradations in a distributed application; for example, may be observed at services or endpoints within a workflow (or trace) of an application that are different from the nodes where they originated. For example, referring to FIG. 18A, an error may be observed by a client at a frontend service 1848, but the error may have originated at the payment service 1849. This makes it challenging to hold a particular service (and associated group of software engineers) responsible for causing the error. Conventional monitoring service may not provide an application developer adequate detail regarding precisely where and how an error originated.

Implementations of the monitoring platform disclosed herein allow clients to track the root cause of a failure within a workflow (associated with a trace), where the failure or error propagated to the root of a trace. When a failure propagates to the root of a trace it typically results in a user of an application experiencing an error at the front end of the application. Based on certain predetermined heuristics, implementations of the monitoring platform disclosed herein perform trace error attribution. Trace error attribution provides a way to attribute the root cause of a failure or error within a workflow (or a trace) to a particular service, which provides clients with a starting point to investigate where errors within the error trace or workflow originate.

More specifically, if a user of the application has a failed interaction when interacting with the application, implementations of the monitoring platform are able to attribute the failed customer interaction to a particular service (and associated span) within a workflow (or trace).

Implementations of the monitoring platform determine the span (and associated service) to which the workflow (or trace) error should be attributed by employing a set of conditions or rules (which are part of the predetermined heuristic). The conditions or rules executed determine whether the service tiers (in a trace) are propagating an error all the way from a leaf error span back up to the root of a trace. As defined above, a "leaf error span" is a span that is the last span of a chain of error spans and does not have a child span that is also an error span. A leaf error span may be a childless span, in which case it would also be a "leaf span." A leaf error span may, however, have a child span, but that child span is not an error span.

Figure 24:
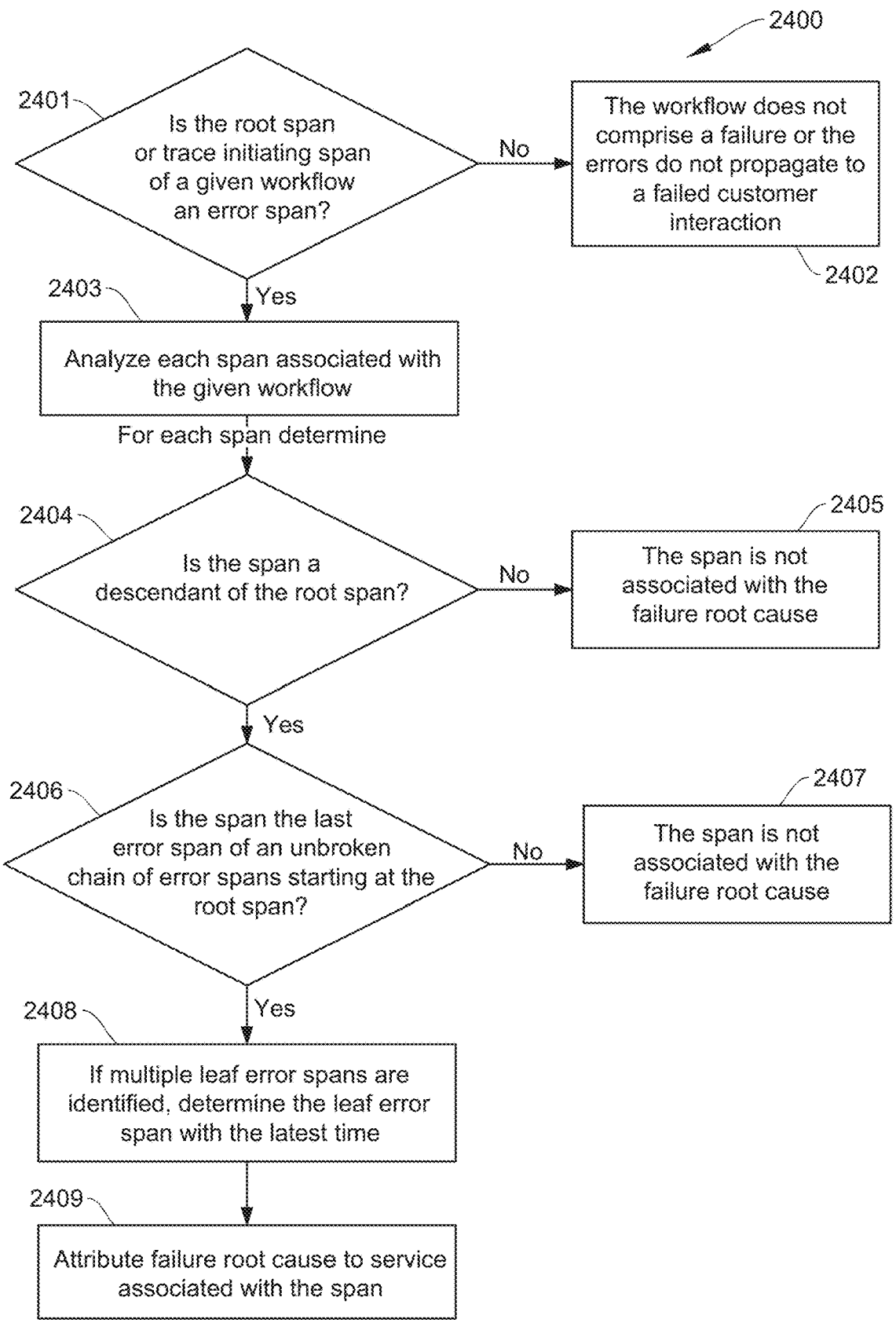
FIG. 24 presents a flowchart illustrating a computer implemented process for identifying the root cause of a failure in a workflow, in accordance with implementations of the monitoring service disclosed herein.

FIG. 24 presents a flowchart illustrating a computer implemented process 2400 for identifying the root cause of a failure in a workflow, in accordance with implementations of the monitoring service disclosed herein. Blocks 2400-2409 describe exemplary steps comprising the process 2400 depicted in FIG. 24, in accordance with the various implementations herein described. In one implementation, the process is implemented at least in part as computer-executable instructions stored in a computer-readable medium and executed in one or more processing devices.

At block 2401, the root span or trace initiating span of the trace associated with a given workflow is analyzed to determine if it is an error span (or presents an error). If the root span is not associated with an error, then, at block 2402, it is determined that the associated trace or workflow either likely does not contain any failures or that the errors within the trace are not resulting in a failed user interaction at the front end of the application. In other words, the errors are not propagating all the way to the root of the trace in a way that a user of the application may encounter an error.

At block 2403, each of the other spans in the given workflow are analyzed to determine which one of them is associated with the service that was the root cause of the failure. For each span in the workflow then, a series of conditions (or rules) that are part of the predetermined heuristic are executed to determine if the respective span is associated with failure root cause service. Note that the heuristic may employ fewer or more rules and that the rules may be altered depending on the manner a client of the monitoring platform may want to designate the failure root cause service in a workflow.

At block 2404, each span is analyzed to determine if it is the descendant of the root span according to regular parent/child relationships. A span that is not a descendant of the root span of the workflow is determined to not be associated with a failure root cause service at block 2405.

At block 2406, each span is analyzed to determine if it is the end error span of an unbroken chain of error spans starting at the root span. In other words, the span associated with the failure root cause, based on the selected heuristic, is the final error span in a chain of error spans that started at the root span of the trace. If a span is not the end span of an unbroken chain of error spans starting at the root span, it is determined not to be associated with the failure root cause service at block 2407.

At block 2408, all the leaf error spans are identified. From the eligible leaf error spans identified, the leaf error span with the latest starting time is determined. At block 2409, the leaf error span with the latest starting time is selected and the service associated with this span is designated as the failure root cause service for the workflow (or trace). Note that selecting the leaf error span with the latest starting time is simply one way to nominate a failure root cause service. In one implementation, the failure root cause attribution heuristic to determine to the failure root cause service may be programmable and selected by a client. For example, a client may want the earlier starting leaf error span to be nominated and associated with the failure root cause service.

FIGS. 25A-25F present exemplary traces that illustrate the manner in which failure root cause spans are determined in different scenarios within the respective workflows, in accordance with implementations of the monitoring service disclosed herein. The trace in FIG. 25A indicates a scenario where one of the spans (span 3) within the trace is an error span but the error does not propagate up to the trace initiating span, span 1. Accordingly, pursuant to the condition presented in block 2401 of FIG. 24, no error attribution is necessary for this trace.

Figure 25A:
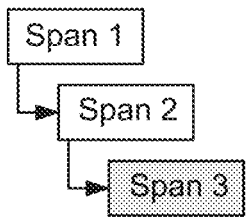
FIGS. 25A-25F present exemplary traces that illustrate the manner in which failure root cause spans are determined in different scenarios within the respective workflows, in accordance with implementations of the monitoring service disclosed herein.
Figure 25B:
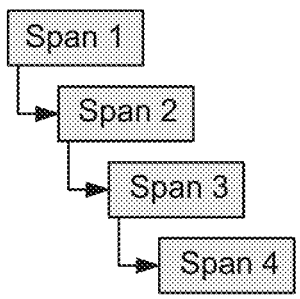

The trace in FIG. 25B indicates a scenario where the trace error is attributed to span 4, the leaf error span (or the leaf span of the error chain comprising spans 1, 2, 3 and 4). Accordingly, the service associated with span 4 would be selected as the failure root cause service pursuant to the heuristic discussed in FIG. 24. Note, that span 4 is descended from the trace initiating span, span 1, and is also the leaf error span of the trace.

Figure 25C:
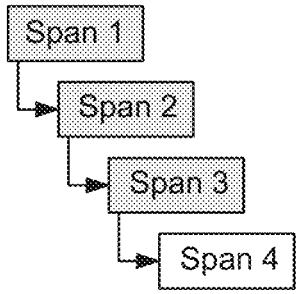

The trace in FIG. 25C indicates a scenario where the trace error is attributed to span 3 because it is the leaf error span (or the leaf span of the error chain). Although span 3 has a child span, span 4 is not an error span. As noted in connection with condition block 2406 from FIG. 24, a span to which the trace error is attributed needs to be the leaf error span of an error chain. Span 4 is not a leaf error span because it is not associated with an error.

Figure 25D:
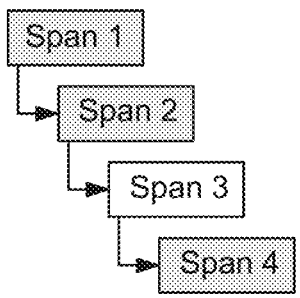

The trace in FIG. 25D indicates a scenario where the trace error is attributed to span 2. Span 2 is the leaf error span of the unbroken chain of errors that started at the trace initiating span, span 1. Span 2 has children span that comprise errors (e.g. span 4) but the chain of errors was broken because span 3 is not associated with an error. Accordingly, because of the break in the error chain, the trace error is attributed to the leaf error span, span 2.

Figure 25E:
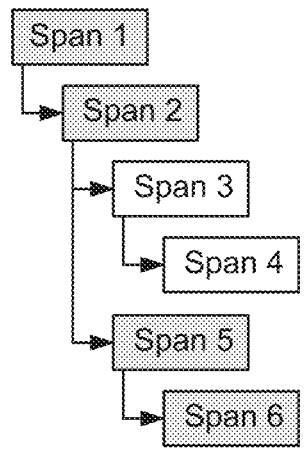

The trace in FIG. 25E indicates a scenario where the trace error is attributed to span 6. Span 6 is the last error span in an unbroken chain of error spans that starts at the trace initiating span, span 1, and continues through span 2 and span 5 before reaching span 6. Accordingly, because span 6 is the leaf span of the error chain, the trace error is attributed to span 6.

Figure 25F:
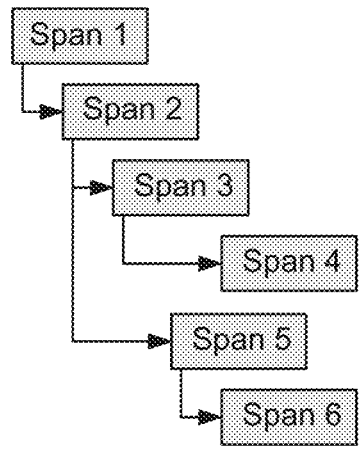

The trace in FIG. 25F indicates a scenario where the trace error is attributed to span 6. The trace in FIG. 25F comprises two leaf error spans, spans 4 and 6. There are two unbroken chains of error spans in the trace of FIG. 25F. The first one starts from the trace initiating span, span 1 and ends at span 4, while the other one starts at span 1 and ends at span 6. Pursuant to block 2408 of FIG. 24, where a condition arises where multiple leaf error spans are identified in a trace, the span with the latest starting span is selected. Accordingly, span 6 (which starts later than span 4) is selected and the error is attributed to the service associated with span 6.

Figure 26A:
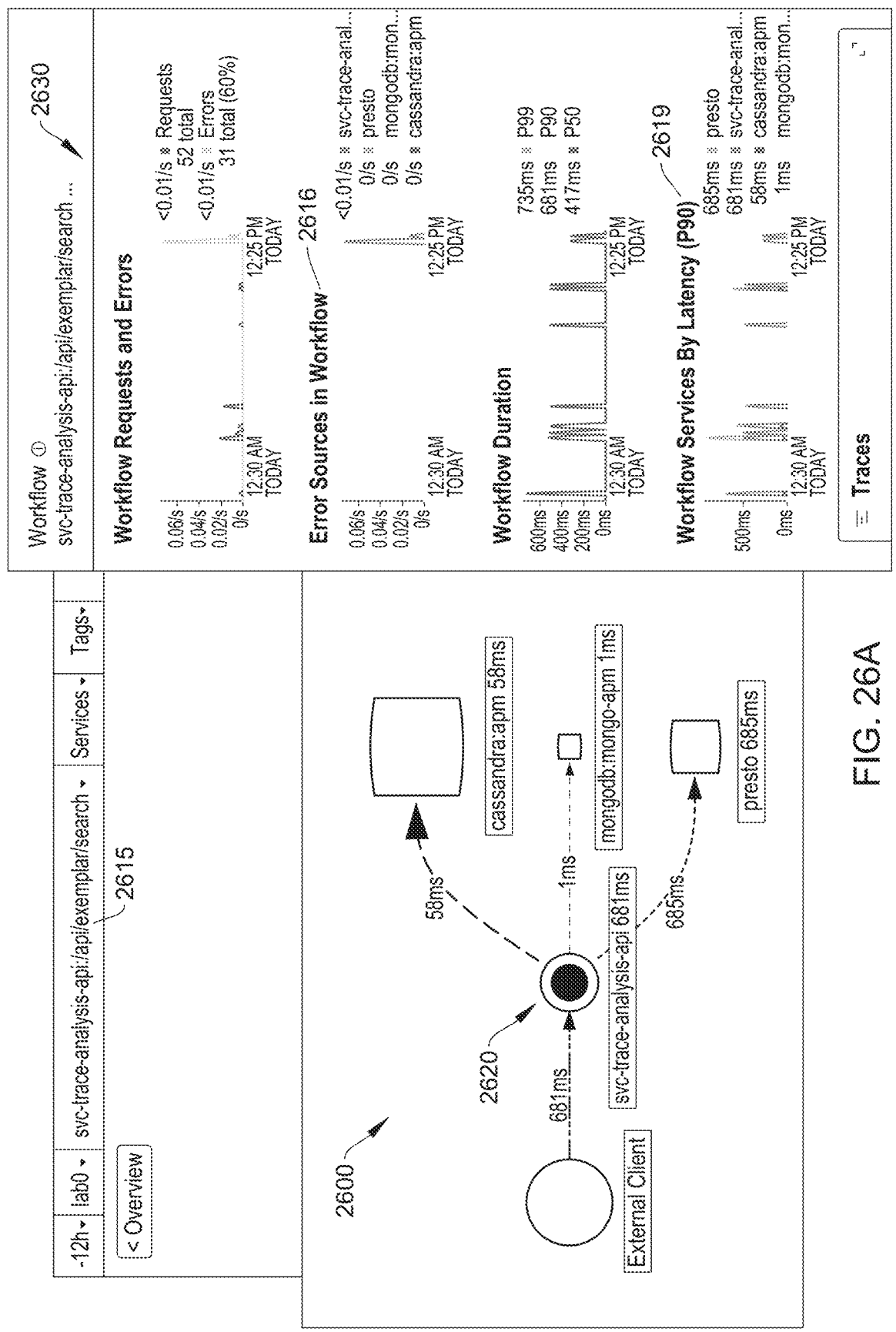
FIGS. 26A and 26B illustrates an exemplary on-screen GUI indicating the manner in which a trace associated with the workflow can be tagged with a global tag comprising the name of the service to which the error has been attributed for purposes of metrics computation, in accordance with implementations of the monitoring service disclosed herein.
Figure 26B:
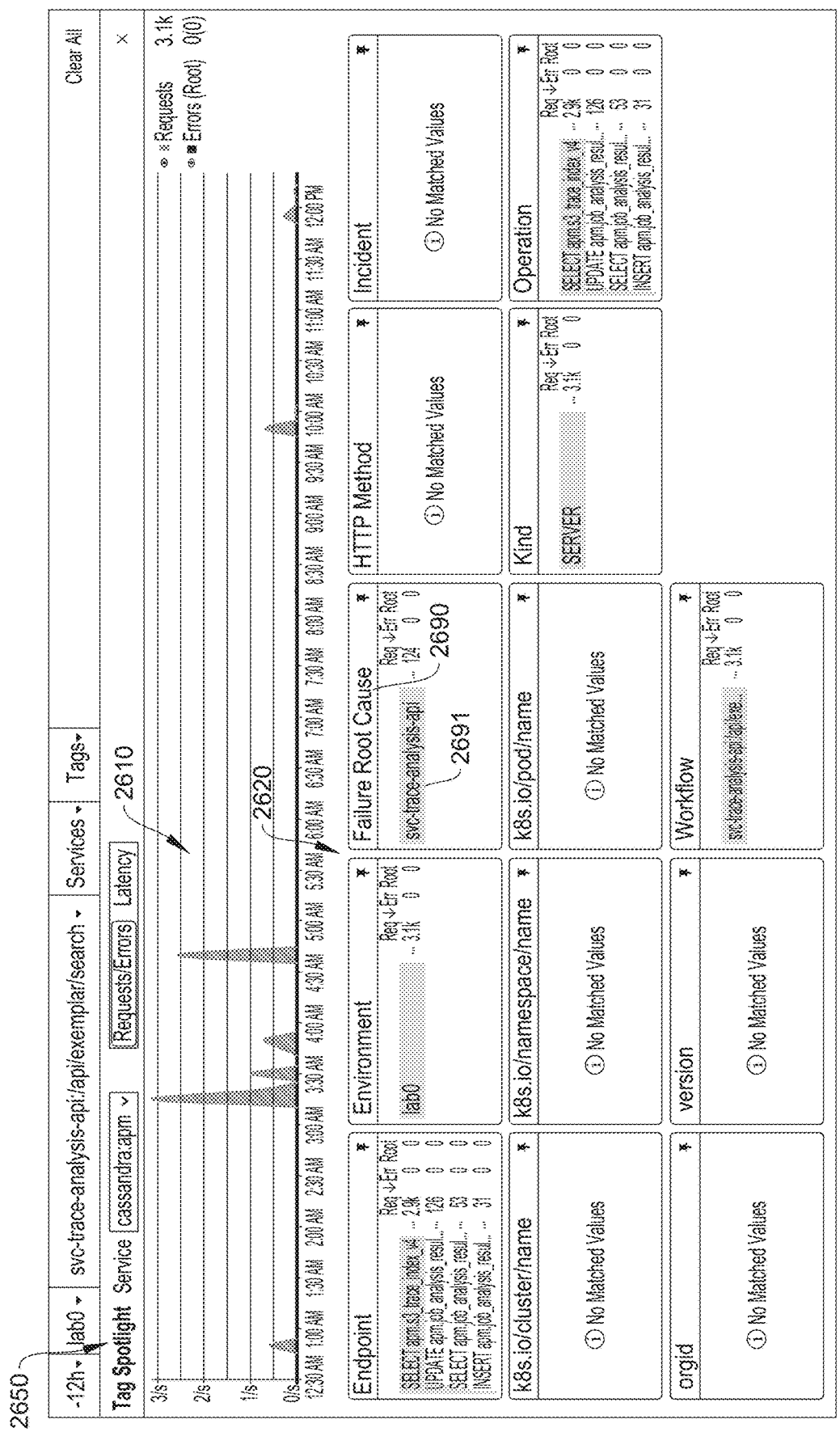

FIGS. 26A and 26B illustrates an exemplary on-screen GUI indicating the manner in which a trace associated with the workflow can be tagged with a global tag comprising the name of the service to which the error has been attributed for purposes of metrics computation, in accordance with implementations of the monitoring service disclosed herein. In one implementation the service map 2600 shown in FIG. 16 is associated with the workflow "svc-trace-analysis/api:/api/exemplar/search" as selected through drop-down menu 2615. As discussed previously, troubleshooting metrics associated with the workflow "svc-trace-analysis/api:/api/exemplar/search" may be shown in a side-panel 2630. Note that the "Error Sources in Workflow" segment 2616 of the side-panel 2630 allows a client to visualize errors encountered by each of the services in the workflow. Also the "Workflow Services by Latency" segment 2619 allows a client to visualize the latency associated with all the services in the workflow, ordered from the highest latency service to the lowest latency service.

In the example of FIG. 26A, the failure root cause service may be "svc-trace-analysis-api" 2620. In one implementation, the service graph for the workflow, as shown in FIG. 26A, may include a visual indicator that clearly shows the client the failure root cause service associated with the workflow. For example, a special symbol (not shown in FIG. 26B) may be displayed on the service "svc-trace-analysis-api" 2620 to indicate that that it is the failure root cause service. Also, an indication may be provided in the side-panel 2630 if one or more of the services in the workflow comprise the failure root cause service. In one implementation, the monitoring service may also automatically alert the client through the graphical user interface of FIG. 26A of a service team or unit for the client associated with failure root cause service that should be contacted in order to diagnose the problem associated with the error.

In one implementation, the monitoring service may tag the trace associated with workflow "svc-trace-analysis/api:/api/exemplar/search" with a global tag subsequent to executing the error attribution hueristic, wherein the global tag comprises the service name of the service to which the error has been attributed. The advantage of tagging the trace with a global tag containing the name of the failure root cause service is that metrics (e.g., RED metrics) may be computed on the tag for free. For example, a client may be able to see the name of the failure root cause service "svc-trace-analysis-api" 2691 populated under the tag for "failure root cause" 2690 in the panel 2620 in FIG. 26B for the Tag Spotlight GUI 2650. Creating the tag for the failure root cause, allows metrics associated with the failure root cause service "svc-trace-analysis-api" 2691 to be displayed along with metrics for the other tags associated with the trace in the Tag Spotlight GUI 2650. Also, panel 2610 in the GUI visually displays the activity (e.g., requests, errors, etc.) associated with the workflow "svc-trace-analysis/api:/api/exemplar/search."

In one implementation, monitoring metrics associated with the metric time series modality may be computed for the "failure root cause" 2690 tag. In another implementation, high-cardinality metrics associated with the metric events modality may also be computed for the "failure root cause" 2690 tag, which provides clients the ability to filter, breakdown, aggregate and compute metrics associated with the tag across a number of different attributes as explained in connection with FIGS. 19 and 20.

As mentioned above, conventional monitoring tools were not able to attribute the error experiencing by a user of an application to a particular service within a trace. Implementations of the monitoring system disclosed therein constitute a significant improvement in that attributing an error to a particular service enables a client to determine which team or service unit associated with the particular erroneous service should be deployed in order to address the problem. Furthermore, indicating a single service in a trace that is responsible for the error prevents a client from being distracted from multiple services with associated error flags.

Instead of diagnosing errors in several services, a client is able to focus on the single service that was responsible for errors propagating through the service tiers in a trace all the way to the root of the trace.

While the principles of the invention have been described above in connection with specific apparatus, it is to be clearly understood that this description is made only by way of example and not as a limitation on the scope of the invention. Further, the foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as may be suited to the particular use contemplated.

The disclosed system addresses a problem in traditional data analysis of instrumented software tied to computer technology, namely, the technical problem of monitoring a sequence of events that occurs in response to a particular user-interaction or client process in a distributed application, and identifying a root cause of failure within the sequence of events. The disclosed system solves this technical problem by providing a solution also rooted in computer technology, namely, by attributing a unique workflow dimension to each trace associated with a particular user-interaction or a client process based on client-specified or machine generated criteria. Further, the disclosed system also identifies a single service in a workflow associated with a trace as the root cause of failure on the trace. The disclosed subject technology further provides improvements to the functioning of the computer itself because it increases the efficiency of the computer.

What is claimed is:

1. A method of computing real-time metrics for automated workflows in a distributed computing environment comprising microservices, the method comprising:
    detecting, via one or more processors, a user request associated with an execution of a microservices-based distributed application within the distributed computing environment;
    monitoring, via the one or more processors, tasks associated with the microservices-based distributed application that executes within the distributed computing environment to generate a plurality of ingested spans for a plurality of user requests, including the user request;
    aggregating, via the one or more processors, the plurality of ingested spans into a plurality of traces, wherein individual ones of the plurality of traces are associated with the user request, of the user requests, that propagates between two or more microservices;
    determining, via the one or more processors, a configuration of a plurality of rules, wherein the configuration indicates an execution priority of the plurality of rules, and wherein rules are associated with determining a manner in which workflow names are assigned to a plurality of workflows associated with the plurality of traces;
    executing via the one or more processors, the plurality of rules according to the execution priority to determine the plurality of workflows associated with the plurality of traces, wherein each workflow of the plurality of workflows is associated with a respective trace of the plurality of traces, and wherein each workflow is operable to group together activity associated with a client process within a respective trace;
    assigning, via the one or more processors, a name to each workflow of the plurality of workflows based on the executing of the plurality of rules, wherein at least a portion of assigned names are based at least in part an occurrence of one or more service names specified in at least a portion of the rules; and
    computing, via the one or more processors, the real-time metrics for each of the plurality of the workflows.

2. The method of claim 1, wherein the real-time metrics are associated with time series of metrics computed using information extracted from the plurality of ingested spans.

3. The method of claim 1, further comprising:
    prior the executing, configuring the plurality of rules responsive to user input via a graphical user interface.

4. The method of claim 1, further comprising:
    prior the executing, configuring the plurality of rules automatically using a machine learning process.

5. The method of claim 1, wherein the executing comprises:
    determining an order of priority for the plurality of rules; and executing the plurality of rules in the order of priority.

6. The method of claim 1, further comprising:
    prior the executing, configuring the plurality of rules responsive to interactions with a graphical user interface; and
    testing the plurality of rules by entering a trace identifier associated with a respective workflow and executing the plurality of rules to determine a name associated with the respective workflow.

7. The method of claim 1, further comprising:
computing high-cardinality metrics for each of the plurality of the workflows, wherein the high-cardinality metrics are operable to be filtered and aggregated across a plurality of different attributes.

8. The method of claim 1, wherein the real-time metrics comprise at least requests, errors and latency related metrics.

9. The method of claim 1, wherein the real-time metrics comprise at least requests, errors and latency metrics, and further comprising:
configuring detectors that flag an alert when any one of requests, errors, or latency metrics cross a predetermined threshold.

10. A non-transitory computer-readable medium having computer-readable program code embodied therein for causing a computer system to perform a method of computing real-time metrics for automated workflows in a distributed computing environment comprising microservices, the method comprising:
detecting a user request associated with an execution of a microservices-based distributed application within the distributed computing environment;
monitoring tasks associated with the microservices-based distributed application that executes within the distributed computing environment to generate a plurality of ingested spans for a plurality of user requests, including the user request;
aggregating the plurality of ingested spans into a plurality of traces;
determining a configuration of a plurality of rules, wherein the configuration indicates an execution priority of the plurality of rules, and wherein rules are associated with determining a manner in which workflow names are assigned to a plurality of workflows associated with the plurality of traces;
executing the plurality of rules according to the execution priority to determine a plurality of workflows associated with the plurality of traces, wherein each workflow of the plurality of workflows is associated with a respective trace of the plurality of traces, and wherein each workflow is operable to group together activity associated with a client process within a respective trace;
assigning a name to each workflow of the plurality of workflows based on the executing of the plurality of rules, wherein at least a portion of assigned names are based at least in part an occurrence of one or more service names specified in at least a portion of the rules; and
computing the real-time metrics for each of the plurality of the workflows.

11. The non-transitory computer-readable medium of claim 10, wherein the real-time metrics are associated with time series of metrics computed using information extracted from the plurality of ingested spans.

12. The non-transitory computer-readable medium of claim 10, wherein the method further comprises:
prior the executing, configuring the plurality of rules responsive to user input via a graphical user interface.

13. The non-transitory computer-readable medium of claim 10, wherein the method further comprises:
prior the executing, configuring the plurality of rules automatically using a machine learning process.

14. The non-transitory computer-readable medium of claim 10, wherein the method further comprises:
determining an order of priority for the plurality of rules; and executing the plurality of rules in the order of priority.

15. The non-transitory computer-readable medium of claim 10, wherein the method further comprises:
prior the executing, configuring the plurality of rules responsive to input received through a graphical user interface; and
testing the plurality of rules by entering a trace identifier associated with a respective workflow and executing the plurality of rules to determine a name associated with the respective workflow.

16. The non-transitory computer-readable medium of claim 10, wherein the method further comprises:
computing high-cardinality metrics for each of the plurality of the workflows, wherein the high-cardinality metrics are operable to be filtered and aggregated across a plurality of different attributes.

17. The non-transitory computer-readable medium of claim 10, wherein the real-time metrics comprises at least requests, errors and latency related metrics.

18. The non-transitory computer-readable medium of claim 10, wherein the real-time metrics comprise at least requests, errors and latency metrics, and wherein the method further comprises:
configuring detectors that flag an alert when any one of requests, errors, or latency metrics cross a predetermined threshold.

19. A system for performing a method of computing real-time metrics for automated workflows, the system comprising:
a processing device communicatively coupled with a memory and configured to:
detect a user request associated with an execution of a microservices-based distributed application within the distributed computing environment;
monitor tasks associated with the microservices-based distributed application within the distributed computing environment to generate a plurality of ingested spans for a plurality of user requests, including the request;
aggregate the plurality of ingested spans into a plurality of traces;
determine a configuration of a plurality of rules, wherein the configuration indicates an execution priority of the plurality of rules, and wherein rules are associated with determining a manner in which workflow names are assigned to a plurality of workflows associated with the plurality of traces;
execute the plurality of rules according to the execution priority to determine a plurality of workflows associated with the plurality of traces, wherein each workflow of the plurality of workflows is associated with a respective trace of the plurality of traces, and wherein each workflow is operable to group together activity associated with a client process within a respective trace;
assign a name to each workflow of the plurality of workflows based on the executing of the plurality of rules, wherein at least a portion of assigned names are based at least in part an occurrence of one or more service names specified in at least a portion of the rules; and
compute real-time metrics for each of the plurality of the workflows.

20. The system of claim 19, wherein the real-time metrics are associated with time series of metrics computed using information extracted from the plurality of ingested spans.

\* \* \* \* \*